United States Patent
Chukka et al.

(10) Patent No.: US 12,367,692 B2
(45) Date of Patent: Jul. 22, 2025

(54) SYSTEMS FOR AUTOMATED IN SITU HYBRIDIZATION ANALYSIS

(71) Applicant: Ventana Medical Systems, Inc., Tucson, AZ (US)

(72) Inventors: Srinivas Chukka, Tucson, AZ (US); Thomas M. Grogan, Tucson, AZ (US); Anindya Sarkar, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 18/668,118

(22) Filed: May 17, 2024

(65) Prior Publication Data

US 2024/0304006 A1 Sep. 12, 2024

Related U.S. Application Data

(63) Continuation of application No. 17/263,452, filed as application No. PCT/US2019/041257 on Jul. 10, 2019, now Pat. No. 12,020,493.

(60) Provisional application No. 62/711,049, filed on Jul. 27, 2018.

(51) Int. Cl.
*G06K 9/00* (2022.01)
*G06V 20/69* (2022.01)

(52) U.S. Cl.
CPC .................. *G06V 20/69* (2022.01)

(58) Field of Classification Search
None
See application file for complete search history.

(56) References Cited

U.S. PATENT DOCUMENTS

| 5,650,327 A | 7/1997 | Copeland et al. |
| 5,654,200 A | 8/1997 | Copeland et al. |
| 6,296,809 B1 | 10/2001 | Richards et al. |

(Continued)

FOREIGN PATENT DOCUMENTS

| CA | 3004504 A1 | 5/2017 |
| CN | 104919299 A | 9/2015 |

(Continued)

OTHER PUBLICATIONS

"11th International Symposium on Biomedical Imaging", Institute of Electrical and Electronics Engineers, Apr. 29-May 2, 2014, 38 pages.

(Continued)

*Primary Examiner* — S J Park
(74) *Attorney, Agent, or Firm* — Kilpatrick Townsend & Stockton LLP

(57) ABSTRACT

The present disclosure provides for image processing systems and methods for analyzing digital images of biological samples stained for the presence of protein and/or nucleic acid biomarkers and detecting and quantifying signals corresponding to one or more biomarkers. The present disclosure also provides systems and methods for the clinical interpretation of dual ISH slides where the cells to score are selected (e.g. by using one or more cell detection and identification algorithms. By detecting, identifying, and selecting cells for assessment, it is believed that subjectivity is reduced or eliminated. The systems and methods also allow for an increased number of cells to be considered for scoring as compared with manual dot counting methods, thereby increasing detection sensitivity, ultimately enabling improved patient care and treatment.

18 Claims, 14 Drawing Sheets

(56) References Cited

U.S. PATENT DOCUMENTS

| | | | |
|---|---|---|---|
| 6,352,861 | B1 | 3/2002 | Copeland et al. |
| 6,827,901 | B2 | 12/2004 | Copeland et al. |
| 6,943,029 | B2 | 9/2005 | Copeland et al. |
| 7,087,379 | B2 | 8/2006 | Light |
| 7,760,927 | B2 | 7/2010 | Gholap et al. |
| 12,020,493 | B2 | 6/2024 | Chukka et al. |
| 2003/0211630 | A1 | 11/2003 | Richards et al. |
| 2004/0052685 | A1 | 3/2004 | Richards et al. |
| 2014/0377753 | A1 | 12/2014 | Bamford et al. |
| 2015/0347702 | A1 | 12/2015 | Chukka et al. |
| 2017/0082627 | A1 | 3/2017 | Dennis et al. |
| 2017/0103521 | A1 | 4/2017 | Chukka |
| 2017/0130281 | A1 | 5/2017 | Patterson |
| 2017/0140246 | A1 | 5/2017 | Barnes et al. |
| 2017/0154420 | A1 | 6/2017 | Barnes et al. |
| 2017/0323148 | A1 | 11/2017 | Sarkar et al. |
| 2017/0337695 | A1 | 11/2017 | Sarkar et al. |

FOREIGN PATENT DOCUMENTS

| | | |
|---|---|---|
| CN | 107209934 A | 9/2017 |
| JP | H11-258233 A | 9/1999 |
| JP | 2001512697 A | 8/2001 |
| JP | 2002500973 A | 1/2002 |
| JP | 2004290141 A | 10/2004 |
| JP | 2005535888 A | 11/2005 |
| JP | 2008514925 A | 5/2008 |
| JP | 2017509871 A | 4/2017 |
| JP | 2017521068 A | 8/2017 |
| JP | 2018517436 A | 7/2018 |
| WO | 2011049608 A2 | 4/2011 |
| WO | 201414 0085 A1 | 9/2014 |
| WO | 2014195193 A1 | 12/2014 |
| WO | 2015049233 A1 | 4/2015 |
| WO | 2015113895 A1 | 8/2015 |
| WO | 2016120442 A1 | 8/2016 |
| WO | 2017212055 A1 | 12/2017 |
| WO | 2018115055 A1 | 6/2018 |

OTHER PUBLICATIONS

"Handbook of Medical Imaging, Processing and Analysis", Academic Press Series in Biomedical Engineering, Chapter 2, 2000, 16 pages.

U.S. Appl. No. 17/263,452 , "Non-Final Office Action", filed Nov. 2, 2023, 6 pages.

U.S. Appl. No. 17/263,452 , "Notice of Allowance", filed Feb. 12, 2024, 9 pages.

Dahle-Smith et al., "Epidermal Growth Factor (EGFR) Copy Number Aberrations in Esophageal and Gastro-Esophageal Junction Carcinoma", Molecular Cytogenetics, vol. 8, No. 78, Oct. 2015, pp. 1-9.

EP Application No. 19746245.0 , "Office Action", Feb. 10, 2023, 5 pages.

Gonzalez et al., "Digital Image Processing", Third Edition, Chapter 10, Image Segmentation, 2008, 5 pages.

JP Application No. 2021-503894 , "Office Action", Dec. 23, 2022, 7 pages.

JP Application No. 2023-070593 , "Office Action", Apr. 1, 2024, 11 pages.

Lawson et al., "Solving Least squares Problems", Prentice Hall, Chapter 23, 1974, 6 pages.

Parvin et al., "Iterative Voting for Inference of Structural Saliency and Characterization of Subcellular Events", Institute of Electrical and Electronics Engineers, Transactions on Image Processing, vol. 16, No. 3, Mar. 2007, pp. 615-623.

International Application No. PCT/US2019/041257 , "International Preliminary Report on Patentability", Feb. 11, 2021, 9 pages.

International Application No. PCT/US2019/041257 , "International Search Report and Written Opinion", Oct. 17, 2019, 11 pages.

Pollack et al., "Genome-Wide Analysis of DNA Copy-Number Changes Using cDNA Microarrays", Nature Genetics, Nature Publishing Group, vol. 23, No. 1, Sep. 1, 1999, pp. 41-46.

Zamay et al., "Current and Prospective Protein Biomarkers of Lung Cancer", Cancers, vol. 9, No. 11, Nov. 13, 2017, pp. 1-22.

Zimmermann , "Spectral Imaging and Linear Unmixing in Light Microscopy", Advances in Biochemical Engineering/Biotechnology, vol. 95, 2005, pp. 245-265.

U.S. Appl. No. 17/263,452 , "Corrected Notice of Allowability", filed May 20, 2024, 2 pages.

CN Application No. 201980048897.6 , "Office Action", Jun. 1, 2024, 18 pages.

CN Application No. 201980048897.6, "Office Action", Jan. 11, 2025, 23 pages.

EP Application No. 19746245.0, "Intention to Grant", Oct. 4, 2024, 7 pages.

JP Application No. "Office Action", Sep. 30, 2024, 7 pages.

CN Application No. 201980048897.6, "Office Action", Mar. 25, 2025, 19 pages.

SYSTEMS FOR AUTOMATED IN SITU HYBRIDIZATION ANALYSIS

CROSS REFERENCE TO RELATED APPLICATIONS

The present application is a continuation of U.S. application Ser. No. 17/263,452, filed Jan. 26, 2021, which is a 35 U.S.C. 371 national phase application of PCT PCT/US2019/041257 filed on Jul. 10, 2019, which claims the benefit of U.S. Provisional Patent Application No. 62/711,049, filed on Jul. 27, 2018, the disclosures of which are hereby incorporated by reference herein in their entireties for all purposes.

FIELD OF THE DISCLOSURE

The present disclosure provides systems and methods for detecting and classifying signals in stained images of biological samples.

BACKGROUND OF THE DISCLOSURE

Digital pathology involves scanning of whole histopathology or cytopathology glass slides into digital images interpretable on a computer screen. These images are processed subsequently by an imaging algorithm or interpreted by a pathologist. In order to examine tissue sections (which are virtually transparent), tissue sections are prepared using colored stains that bind selectively to cellular components. Color-enhanced, or stained, cellular structures are used by clinicians or a computer-aided diagnosis (CAD) algorithm to identify morphological markers of a disease and to guide therapy accordingly. Observing the assay enables a variety of processes, including the diagnosis of a disease, the assessment of a response to treatment, and the development of new drugs to fight a disease.

Immunohistochemical (IHC) slide staining can be utilized to identify proteins in cells of a tissue section and hence is widely used in the study of different types of cells, such as cancerous cells and immune cells in biological tissue. Thus, IHC staining may be used in research to understand the distribution and localization of the differentially expressed biomarkers of immune cells (such as T-cells or B-cells) in a cancerous tissue for an immune response study. For example, tumors often contain infiltrates of immune cells, which may prevent the development of tumors or favor the outgrowth of tumors.

In-situ hybridization (ISH) can be used to look for the presence of a genetic abnormality or condition such as amplification of cancer causing genes specifically in cells that, when viewed under a microscope, morphologically appear to be malignant. Unique nucleic acid sequences occupy precise positions in chromosomes, cells and tissues and in-situ hybridization allows the presence, absence and/or amplification status of such sequences to be determined without major disruption of the sequences. ISH employs labeled DNA or RNA probe molecules that are anti-sense to a target gene sequence or transcript to detect or localize targeted nucleic acid target genes within a cell or tissue sample. ISH is performed by exposing a cell or tissue sample immobilized on a glass slide to a labeled nucleic acid probe which is capable of specifically hybridizing to a given target gene in the cell or tissue sample. Several target genes can be simultaneously analyzed by exposing a cell or tissue sample to a plurality of nucleic acid probes that have been labeled with a plurality of different nucleic acid tags. By utilizing labels having different emission wavelengths, simultaneous multicolored analysis may be performed in a single step on a single target cell or tissue sample.

BRIEF SUMMARY OF THE DISCLOSURE

It is believed that IHC and ISH can target different molecules (e.g. biomarkers) where one molecule may be the precursor to the other. As such, performing ISH and IHC together (e.g. either simultaneously or sequentially) can provide complementary information to identify the origin of secreted proteins, identify complex tissue structure, identify gene expression regulation, and/or assess therapy. In view of the foregoing, the present disclosure provides, in some embodiments, systems and methods of detecting genetic aberrations (e.g. high copy numbers, chromosomal abnormalities, etc.) within cells which are selected for assessment (e.g. automatically selected for assessment). In some embodiments, the cells which are automatically selected for assessment are located within tumor tissue regions which comprise cells meeting predetermined protein biomarker staining criteria. By using an automated cell selection process, it is believed that any subjectivity introduced during a manual cell selection process may be reduced and/or eliminated. Moreover, the systems and methods of the present disclosure allow for a larger quantity of cells to be used for detecting genetic aberrations, thus facilitating a more robust assessment, and ultimately providing for improved patient care and therapy.

In one aspect of the present disclosure is system for assessing genetic aberrations in images of biological samples (such as those stained for the presence of at least one nucleic acid biomarker and/or protein biomarker) the system comprising: (i) one or more processors, and (ii) one or more memories coupled to the one or more processors, the one or more memories to store computer-executable instructions that, when executed by the one or more processors, cause the system to perform operations comprising: (a) identifying cells in a first image stained for the presence of at least one protein biomarker (e.g. a HER2 protein biomarker) that meet predetermined protein biomarker staining criteria; (b) deriving tumor tissue regions (e.g. epithelia tumor tissue regions) in the first image encompassing those identified cells meeting the predetermined protein biomarker staining criteria; (c) registering the first image and a second image to a common coordinate system such that the derived tumor tissue regions in the first image are mapped to the second image to provide mapped tumor tissue regions, wherein the second image includes signals corresponding to the presence of the at least one nucleic acid biomarker (e.g. HER2 and Chromosome 17 nucleic acid biomarkers); (d) identifying dots within the mapped tumor tissue regions corresponding to the signals from the at least one nucleic acid biomarker; and (e) assessing whether tumor nuclei in the mapped tumor tissue regions in the second image have genetic aberrations (e.g. a gene copy number) based on the identified dots. In some embodiments, a number of nuclei assessed in each mapped tissue region is greater than 20.

In some embodiments, the nuclei are assessed for genetic aberrations by determining whether a total number of identified dots corresponding to signals from the at least one nucleic acid biomarker in each nucleus meet a predetermined threshold value (e.g. where a single nucleic acid biomarker is analyzed). In other embodiments, the nuclei are assessed for genetic aberrations by (i) calculating a ratio of first identified dots corresponding to signals from a first nucleic acid biomarker in each nucleus to second identified dots corresponding to a second nucleic acid biomarker in each nucleus; and (ii) comparing the calculated ratio for each nucleus to a predetermined threshold value. In some embodiments, the first nucleic acid biomarker is HER2 and the second nucleic acid biomarker is Chromosome 17; and wherein the at least one protein biomarker is a HER2 protein biomarker. In some embodiments, the first nucleic acid biomarker is EGFR and the second nucleic acid biomarker is Chromosome 7; and wherein the at least one protein biomarker is an EGFR protein biomarker. The skilled artisan will appreciate that other protein biomarkers and nucleic acid biomarkers may be utilized, including those biomarkers that are precursors to one another.

In some embodiments, the system further comprises assigning a first indicia (e.g. a first color, or a first symbol) to those assessed nuclei where the calculated ratio is above the predetermined threshold value and assigning a second indicia (e.g. a second color, or a second symbol) to those assessed nuclei where the calculated ratio is equal to or below the predetermined threshold value. In some embodiments, the system further comprises generating an overlay image based on the assigned first indicia and the assigned second indicia. In some embodiments, the generated overlay is superimposed over a whole slide image or a portion thereof. In some embodiments, the overlay image is a foreground segmentation mask.

In some embodiments, the system further comprises ranking the assessed nuclei according to the calculated ratios for each nucleus (e.g. the ranking can be in the form of a table sorting the calculated ratios in descending order, and the table may optionally include location information, such as coordinates of the nucleus or cell within the image). In some embodiments, the system further comprises generating a binned histogram plot of the calculated ratios for all assessed nuclei. In some embodiments, a separate binned histogram plot is generated for each mapped tissue region. In some embodiments, the system further comprises identifying the histogram bin having the greatest count. In some embodiments, the system further comprises determining a course of treatment based on data from the generated binned histogram plot (e.g. whether or not to administer a targeted therapy; whether or not to administer a combination therapy).

In some embodiments, the predetermined protein biomarker staining criteria is a staining intensity threshold. In some embodiments, the staining intensity threshold is a cutoff value for the presence of membrane staining. In some embodiments, the predetermined biomarker staining criteria is an expression score computed for a cell. In some embodiments, the genetic aberration is an abnormal gene copy number. In some embodiments, the abnormal gene copy number is a copy number which is greater than a normal copy number for the gene. In some embodiments, the genetic aberration is a chromosomal abnormality. In some embodiments, the genetic aberration is RNA overexpression.

In another aspect of the present disclosure is a method of assessing genetic aberrations in images of biological samples stained for the presence of at least one nucleic acid biomarker comprising: detecting cells in a first image stained for the presence of at least one protein biomarker that meet predetermined protein biomarker staining criteria; deriving tumor tissue regions in the first image encompassing those identified cells meeting the predetermined protein biomarker staining criteria; registering the first image and a second image to a common coordinate system such that the derived tumor tissue regions in the first image are mapped to the second image to provide mapped tissue regions, wherein the second image includes signals corresponding to the presence of the at least one nucleic acid biomarker; identifying dots within the mapped tissue regions corresponding to signals from the at least one nucleic acid biomarker; and assessing whether tumor nuclei in the mapped tissue regions in the second image have genetic aberrations based on the identified dots corresponding to the signals from the at least one nucleic acid biomarker. In some embodiments, the genetic aberration is RNA overexpression. In some embodiments, the genetic aberration is an abnormal gene copy number. In some embodiments, the abnormal gene copy number is a copy number which is greater than a normal copy number for the gene.

In some embodiments, the tumor nuclei are assessed for genetic aberrations by: (i) for each nucleus, calculating a ratio of identified dots corresponding to signals from a first nucleic acid biomarker to identified dots corresponding to signals from a second nucleic acid biomarker; and (ii) comparing the calculated ratio for each nucleus to a predetermined threshold value. In some embodiments, the method further comprises assigning a first indicia to those tumor nuclei where the calculated ratio is above the predetermined threshold value and assigning a second indicia to those tumor nuclei where the calculated ratio is equal to or below the predetermined threshold value. In some embodiments, the method further comprises generating an overlay image based on the assigned first and second indicia. In some embodiments, the method further comprises a binned histogram plot of the calculated ratios for all identified nuclei. In some embodiments, the method further comprises ranking assessed tumor nuclei according to the calculated ratios for each nucleus.

In some embodiments, the biological sample is stained for the presence of the HER2 and Chromosome 17 nucleic acid biomarkers. In embodiments where the biological sample is stained for the presence of the HER2 and Chromosome 17 nucleic acid biomarkers, the method comprises detecting dots in the mapped tissue regions that meet criteria for absorbance strength, black unmixed image channel strength, red unmixed image channel strength, and a difference of Gaussian threshold; and classifying the detected dots as belonging to a black nucleic acid biomarker signal corresponding to HER2 or to a red nucleic acid biomarker signal corresponding to Chromosome 17. In embodiments where the biological sample is stained for the presence of the HER2 and Chromosome 17 nucleic acid biomarkers, the tumor nuclei are assessed by (i) calculating a ratio of those classified dots belonging to the black nucleic acid biomarker signal and those belonging to the red nucleic acid biomarker signal; and (ii) comparing the calculated ratio of a predetermined threshold value. In embodiments where the biological sample is stained for the presence of the HER2 and Chromosome 17 nucleic acid biomarkers, the at least one protein biomarker is a HER2 protein biomarker. In embodiments where the biological sample is stained for the presence of the HER2 and Chromosome 17 nucleic acid biomarkers, the method further comprises identifying whether a patient is positive or negative for HER2 based on the assessed tumor nuclei. In embodiments where the biological sample is stained for the presence of the HER2 and Chromosome 17 nucleic acid biomarkers, the method further comprises scoring the biological sample for the presence of at least one additional protein biomarker. In some embodiments, the at least one additional protein biomarker is selected from the group consisting of EGFR.

In another aspect of the present disclosure is a non-transitory computer-readable medium storing instructions for assessing genetic aberrations in a biological sample stained for the presence of at least one nucleic acid biomarker comprising: identifying cells in a first image stained for the presence of at least one protein biomarker that meet predetermined protein biomarker staining criteria; deriving tumor tissue regions in the first image encompassing those identified cells meeting the predetermined protein biomarker staining criteria; registering the first image and a second image to a common coordinate system such that the derived tumor tissue regions in the first image are mapped to the second image to provide mapped tissue regions, wherein the second image includes signals corresponding to the presence of the at least one nucleic acid biomarker; detecting dots within the mapped tissue regions corresponding to signals from the at least one nucleic acid biomarker; counting all detected dots within each tumor nucleus in each mapped tissue region; and assessing whether each tumor nucleus in each mapped region has a genetic aberration based on a total number of dots counted in each nucleus. In some embodiments, the predetermined protein biomarker staining criteria is a staining intensity threshold. In some embodiments, the genetic aberration is selected from the group consisting of an abnormal gene copy number and a chromosomal abnormality.

In some embodiments, the biological sample is stained for the presence of at least two nucleic acid biomarkers, and wherein dots corresponding to each of the at least two nucleic acid biomarkers are detected and counted for each nucleus. In some embodiments, the tumor nucleus is assessed by (i) calculating a ratio of counted first dots to counted second dots; and (ii) comparing the calculated ratio with a clinically relevant threshold value.

In some embodiments, the non-transitory computer-readable medium further comprises instructions for generating an image overlay wherein each assessed nucleus is assigned a color based on the whether the calculated ratio is either (i) at or below the clinically relevant threshold; or (ii) above the clinically relevant threshold. In some embodiments, the non-transitory computer-readable medium further comprises instructions for ranking the assessed nuclei in each mapped tissue region according to the calculated ratio. In some embodiments, the non-transitory computer-readable medium further comprises instructions for generating a binned histogram plot of the calculated ratios.

BRIEF DESCRIPTION OF THE FIGURES

For a general understanding of the features of the disclosure, reference is made to the drawings. In the drawings, like reference numerals have been used throughout to identify identical elements.

DETAILED DESCRIPTION

Figure 1:
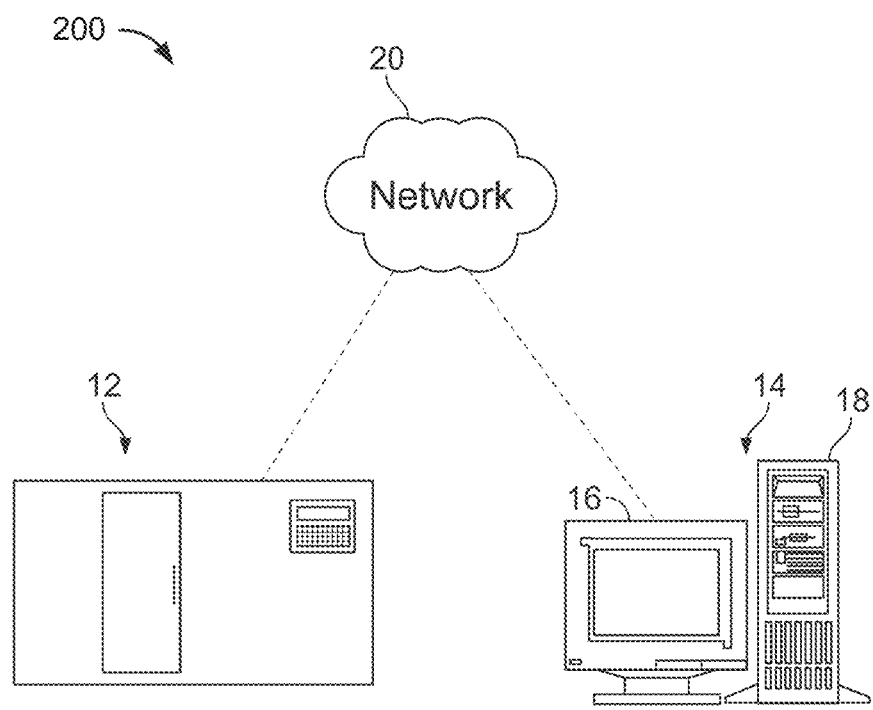
FIG. 1 illustrates a representative digital pathology system including an image acquisition device and a computer system, in accordance with some embodiments.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "biological sample," "tissue sample," "specimen" or the like refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample) prepared from a tumor or a portion thereof obtained from a subject.

A "blob" or "dot" as used herein is a region of a digital image in which some properties are constant or approximately constant; all the pixels in a blob can be considered in some sense to be similar to each other. Depending on the specific application and in-situ signals to be detected, a "dot" typically comprises 5-60 pixels whereby, for example, a pixel may correspond to about 0.25 microns by 0.25 microns of a tissue slide.

As used herein, the phrase "dual in situ hybridization" or "DISH" refers to an in situ hybridization (ISH) method using two probes to detect two different target sequences. Typically, these two probes are differently labeled. In some embodiments, DISH may be an assay to determine the HER2 gene amplification status by contacting a sample of a tumor with a HER2-specific probe and a chromosome 17 centromere probe and determining a ratio of HER2 genomic DNA to chromosome 17 centromere DNA (such as a ratio of HER2 gene copy number to chromosome 17 centromere copy number). The method includes utilizing different detectable labels and/or detection systems for each of the HER2 genomic DNA and chromosome 17 centromere DNA, such that each can be individually visually detected in a single sample.

As used herein, the term "EGFR" refers to the epidermal growth factor receptor, a member of the ErbB family of receptors, a subfamily of four closely related receptor tyrosine kinases: EGFR (ErbB-1), HER2/neu (ErbB-2), Her 3 (ErbB-3) and Her 4 (ErbB-4)

As used herein, the term "image data" encompasses raw image data acquired from the biological tissue sample, such as by means of an optical sensor or sensor array, or pre-processed image data. In particular, the image data may comprise a pixel matrix.

As used herein, the terms "image," "image scan," or "scanned image" encompasses raw image data acquired from the biological tissue sample, such as by means of an optical sensor or sensor array, or pre-processed image data. In particular, the image data may comprise a pixel matrix.

As used herein, the terms "multi-channel image" or "multiplex image" encompasses a digital image obtained from a biological tissue sample in which different biological structures, such as nuclei and tissue structures, are simultaneously stained with specific fluorescent dyes, quantum dots, chromogens, etc., each of which fluoresces or are otherwise detectable in a different spectral band thus constituting one of the channels of the multi-channel image.

As used herein, the terms "probe" or "oligonucleotide probe" refers to a nucleic acid molecule used to detect a complementary nucleic acid target gene.

As used herein, the term "slide" refers to any substrate (e.g., substrates made, in whole or in part, glass, quartz, plastic, silicon, etc.) of any suitable dimensions on which a biological specimen is placed for analysis, and more particularly to a "microscope slide" such as a standard 3 inch by 1 inch microscope slide or a standard 75 mm by 25 mm microscope slide. Examples of biological specimens that can be placed on a slide include, without limitation, a cytological smear, a thin tissue section (such as from a biopsy), and an array of biological specimens, for example a tissue array, a cellular array, a DNA array, an RNA array, a protein array, or any combination thereof. Thus, in one embodiment, tissue sections, DNA samples, RNA samples, and/or proteins are placed on a slide at particular locations. In some embodiments, the term slide may refer to SELDI and MALDI chips, and silicon wafers.

As used herein, the term "specific binding entity" refers to a member of a specific-binding pair. Specific binding pairs are pairs of molecules that are characterized in that they bind each other to the substantial exclusion of binding to other molecules (for example, specific binding pairs can have a binding constant that is at least $10^3$ M−1 greater, $10^4$ M−1 greater or $10^5$ M−1 greater than a binding constant for either of the two members of the binding pair with other molecules in a biological sample). Particular examples of specific binding moieties include specific binding proteins (for example, antibodies, lectins, avidins such as streptavidins, and protein A). Specific binding moieties can also include the molecules (or portions thereof) that are specifically bound by such specific binding proteins.

As used herein, the terms "stain," "staining," or the like as used herein generally refers to any treatment of a biological specimen that detects and/or differentiates the presence, location, and/or amount (such as concentration) of a particular molecule (such as a lipid, protein or nucleic acid) or particular structure (such as a normal or malignant cell, cytosol, nucleus, Golgi apparatus, or cytoskeleton) in the biological specimen. For example, staining can provide contrast between a particular molecule or a particular cellular structure and surrounding portions of a biological specimen, and the intensity of the staining can provide a measure of the amount of a particular molecule in the specimen. Staining can be used to aid in the viewing of molecules, cellular structures and organisms not only with bright-field microscopes, but also with other viewing tools, such as phase contrast microscopes, electron microscopes, and fluorescence microscopes. Some staining performed by the system can be used to visualize an outline of a cell. Other staining performed by the system may rely on certain cell components (such as molecules or structures) being stained without or with relatively little staining other cell components. Examples of types of staining methods performed by the system include, without limitation, histochemical methods, immunohistochemical methods, and other methods based on reactions between molecules (including non-covalent binding interactions), such as hybridization reactions between nucleic acid molecules. Particular staining methods include, but are not limited to, primary staining methods (e.g., H&E staining, Pap staining, etc.), enzyme-linked immunohistochemical methods, and in situ RNA and DNA hybridization methods, such as fluorescence in situ hybridization (FISH).

As used herein, the term "target" refers to any molecule for which the presence, location and/or concentration is or can be determined. Examples of target molecules include proteins, nucleic acid sequences, and haptens, such as haptens covalently bonded to proteins. Target molecules are typically detected using one or more conjugates of a specific binding molecule and a detectable label.

Overview

The present disclosure provides systems and methods for detecting genetic aberrations (e.g. high copy numbers or chromosomal abnormalities) within cells, such as cells which are automatically selected for assessment. In some embodiments, the cells which are automatically selected for assessment are located within tumor tissue regions which comprise cells meeting predetermined protein biomarker staining criteria. By automatically selecting cells for assessment, subjectivity is reduced or eliminated. It is believed that the automated systems and methods described herein enable improved patient outcome and an improved selection of therapeutic regimens since the disclosed systems and methods comparatively utilize additional data as compared with manual analysis methods.

While examples herein may refer to specific tissues and/or the application of specific stains or detection probes for the detection of certain biomarkers (and hence diseases), the skilled artisan will appreciate that different tissues and different stains/detection probes may be applied to detect different markers and different diseases. For example, although certain examples may refer to quantifying amounts of signals corresponding to the HER2 and Chr17 nucleic acid biomarkers, the systems and methods described herein may be applied to detect and quantify signals from a single nucleic acid probe, any combination two or more nucleic acid probes, etc. Indeed, the systems and methods described herein may be adapted to determine gene copy number or chromosomal aberrations using any ISH assay or dual ISH assay (including those utilizing chromogens or fluorophores as labels, or any combination thereof).

In the context of HER2 status for breast and/or gastric cancers, the need for accurate determination of HER2 status is illustrated by the excellent results of therapies targeting HER2 in the clinic. Trastuzumab and lapatinib are well-tolerated in patients with little toxicity, since its effects are relatively specific for cancer cells overexpressing HER2. As such, determining whether HER2 status of a breast or gastric cancer is an important step in deciding on a treatment plan.

The HER2 protein is expressed in the cell membrane of both normal and neoplastic human breast tissues. In humans, the HER2 gene, located on Chromosome 17, encodes the HER2 protein. Overexpression of the HER2 protein, amplification of the HER2 gene, or both occurs in approximately 15 to 25 percent of breast cancers and is believed to be associated with aggressive tumor behavior. Breast cancer cells can have up to 25 to 50 copies of the HER2 gene, and up to 40 to 100-fold increase in HER2 protein resulting in 2 million receptors expressed at the tumor cell surface. Therefore, the differential in HER2 expression between normal tissues and tumors helps to define HER2 as an ideal treatment target.

Figure 12:
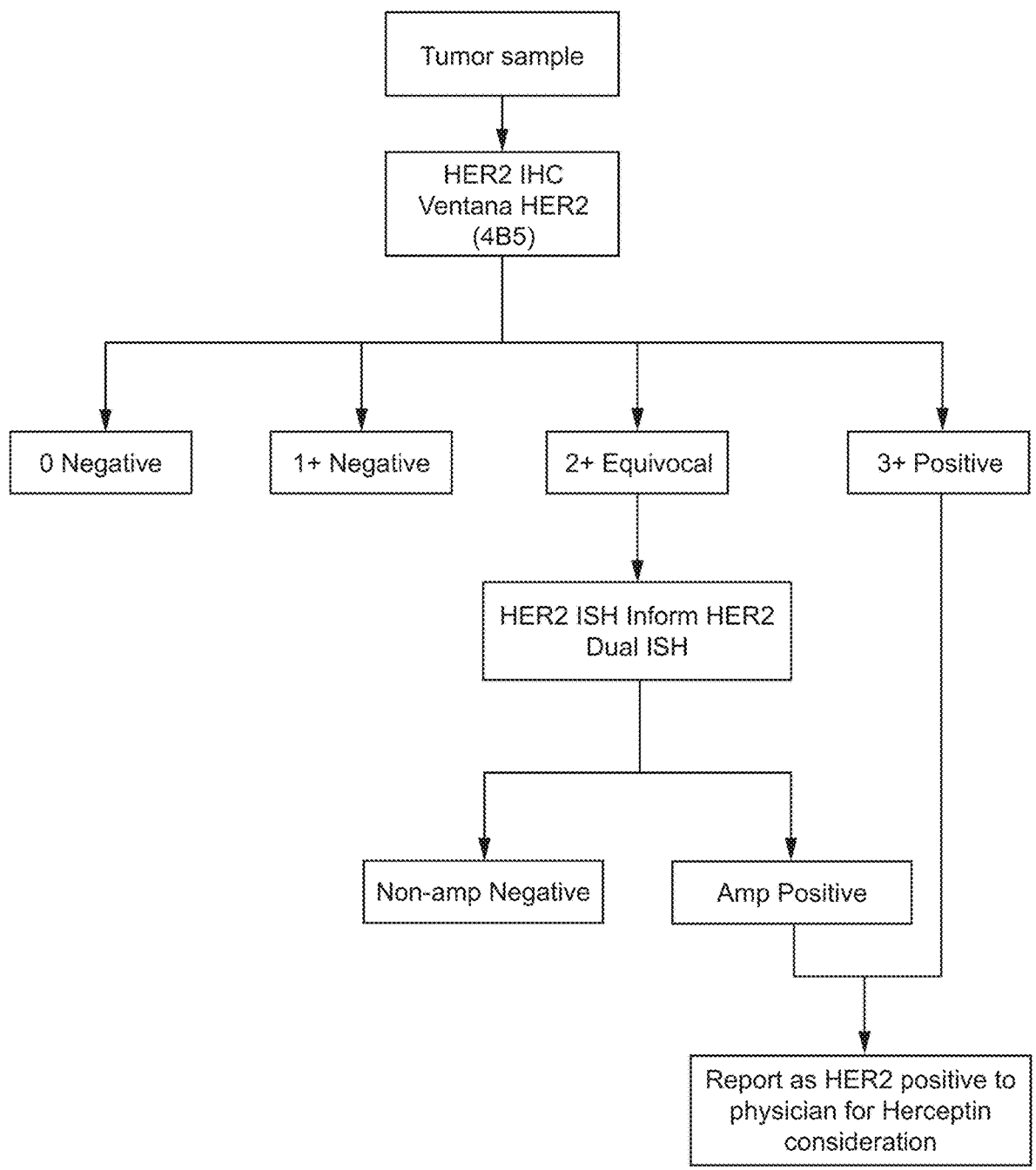
FIG. 12 illustrates a workflow for HER2 protein biomarker testing.

Traditionally, a tissue section is examined for the pattern and the intensity of staining including a determination of the completeness of the cell membrane stain (see FIG. 12). In the context of breast tissue stained for the presence of the HER2 protein, staining that completely encircles the cell membrane is scored as "2+" or "3+." Partial, incomplete staining of the membrane is scored as "1+." The most difficult area of interpretation is cases that fall on the borderline between an intensity level of "1+" and "2+", or where there is a mixture of different expression levels. In these instances, alternative testing with ISH, such as HER2 DUAL ISH, are useful for further interpretation.

Dual ISH staining results in visualization in which HER2 appears as discrete black signals (SISH) and Chr17 as red signals (Red ISH) in nuclei of normal cells as well as in carcinoma cells. This strategy allows HER2 gene status determination in the context of its chromosomal state. Copy numbers of both probes are enumerated in tumor nuclei and results are reported as a ratio of HER2/Chromosome 17 to determine HER2 amplification status (HER2/Chr17 ratio ≥2.0 is amplified, while a ratio <2.0 is non-amplified).

In a manual process, a pathologist visually reviews the Dual ISH tissue slide under a microscope and visually selects a set of twenty to forty tumor cells, notes the count of dual probes (red and silver probes/dots) in each cell, computes the ratio of the sum of the silver/black dots to the sum of the red dots, and compares the computed ratio against a threshold value (=2.0) to classify the patient tissue slide as Dual ISH positive or Dual ISH negative. In the algorithmic workflow, a Dual ISH tissue slide is digitized using either a digital microscope or whole slide scanner (such as those described herein) and the digital image is reviewed by a pathologist on a whole slide viewing software application (such as Virtuoso, Ventana Medical Systems, Inc., Tucson, AZ) to manually select image regions to analyze. The pathologist digitally annotates twenty or forty cells to compute a slide score. The annotated cells are algorithmically analyzed using an image analysis algorithm which automatically detects and outputs the number of red and black/silver dots in each cell and, using the identical scoring guideline as in the manual approach, the slide score and the DUAH ISH positive/negative status for the slide are output for further review and approval by the pathologist. These processes are believed to be time consuming. The present disclosure provides for a comparatively fast, effective workflow for determining, in some embodiments, a DUAL ISH positive/negative status. As compared with the manual process, more cells and/or other structures are able to be analyzed, enhancing analysis and improving patient treatment and outcome.

In view of the foregoing, in some embodiments, the present disclosure provides systems and methods for the clinical interpretation of dual ISH slides where (i) the cells to score are automatically selected, thus alleviating subjectivity from the manual selection of cells; (ii) an increased number of cells may be considered for scoring as compared with traditional methods, i.e. more than 20 cells may be analyzed; and (iii) relevant feedback, e.g. visualization, may be provided to a pathologist to facilitate a more robust (and quicker) analysis. Ultimately, the systems and methods of the present disclosure enable enhanced patient care and improved patient outcomes.

At least some embodiments of the present disclosure relate to digital pathology systems and methods for analyzing image data captured from biological samples, including tissue samples, stained with one or more primary stains (e.g. hematoxylin and eosin (H&E)) and one or more detection probes (e.g. probes containing a specific binding entity which facilitates the labeling of targets within the sample). A digital pathology system 200 for imaging and analyzing specimens, in accordance with some embodiments, is illustrated in FIG. 1. In some embodiments, a digital pathology system includes, for example, a digital data processing device, e.g. a computer, comprising an interface for receiving image data from a slide scanner, a camera, a network and/or a storage medium. In other embodiments, a digital pathology system may comprise an imaging apparatus 12 (e.g. an apparatus having means for scanning a specimen-bearing microscope slide) and a computer 14, whereby the imaging apparatus 12 and computer may be communicatively coupled together (e.g. directly, or indirectly over a network 20). The computer system 14 can include a desktop computer, a laptop computer, a tablet, or the like, digital electronic circuitry, firmware, hardware, memory, a computer storage medium, a computer program or set of instructions (e.g. where the program is stored within the memory or storage medium), one or more processors (including a programmed processor), and any other hardware, software, or firmware modules or combinations thereof. For example, the computing system 14 illustrated in FIG. 1 may comprise a computer with a display device 16 and an enclosure 18. The computer can store digital images in binary form (locally, such as in a memory, on a server, or another network connected device). The digital images can also be divided into a matrix of pixels. The pixels can include a digital value of one or more bits, defined by the bit depth. The skilled artisan will appreciate that other computer devices or systems may be utilized and that the computer systems described herein may be communicatively coupled to additional components, e.g. specimen analyzers, microscopes, other imaging systems, automated slide preparation equipment, etc. Some of these additional components and the various computers, networks, etc. that may be utilized are described further herein.

In general, the imaging apparatus 12 (or other image source including pre-scanned images stored in a memory or in one or more memories) can include, without limitation, one or more image capture devices. Image capture devices can include, without limitation, a camera (e.g., an analog camera, a digital camera, etc.), optics (e.g., one or more lenses, sensor focus lens groups, microscope objectives, etc.), imaging sensors (e.g., a charge-coupled device (CCD), a complimentary metal-oxide semiconductor (CMOS) image sensor, or the like), photographic film, or the like. In digital embodiments, the image capture device can include a plurality of lenses that cooperate to prove on-the-fly focusing. An image sensor, for example, a CCD sensor can capture a digital image of the specimen. In some embodiments, the imaging apparatus 12 is a brightfield imaging system, a multispectral imaging (MSI) system or a fluorescent microscopy system. The digitized tissue data may be generated, for example, by an image scanning system, such as a VENTANA iScan HT scanner by VENTANA MEDICAL SYSTEMS, Inc. (Tucson, Arizona) or other suitable imaging equipment. Additional imaging devices and systems are described further herein. The skilled artisan will appreciate that the digital color image acquired by the imaging apparatus 12 can be conventionally composed of elementary color pixels. Each colored pixel can be coded over three digital components, each comprising the same number of bits, each component corresponding to a primary color, generally red, green or blue, also denoted by the term "RGB" components.

Figure 2:
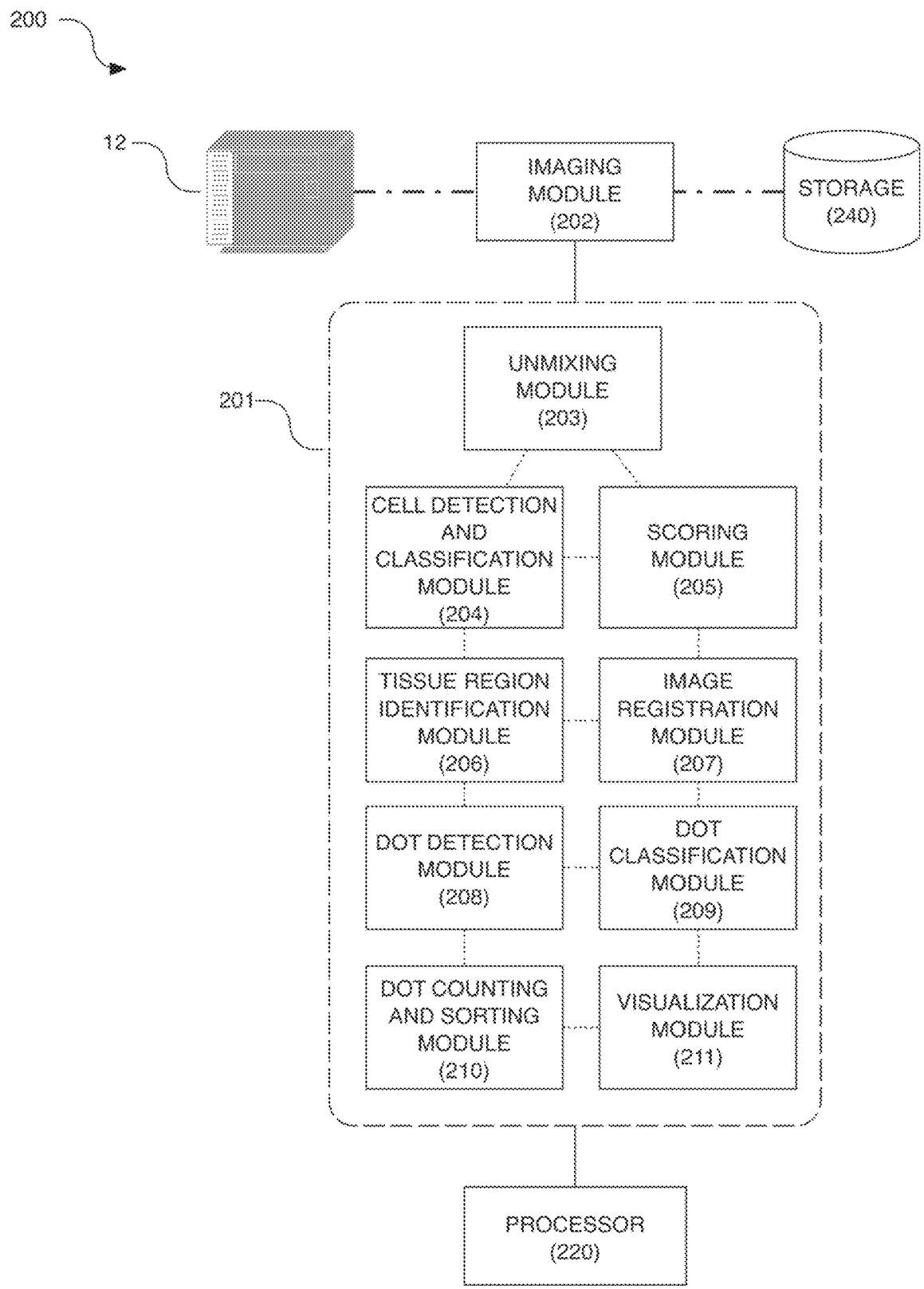
FIG. 2 sets forth various modules that can be utilized in a digital pathology system or within a digital pathology workflow, in accordance with some embodiments.
Figure 3:
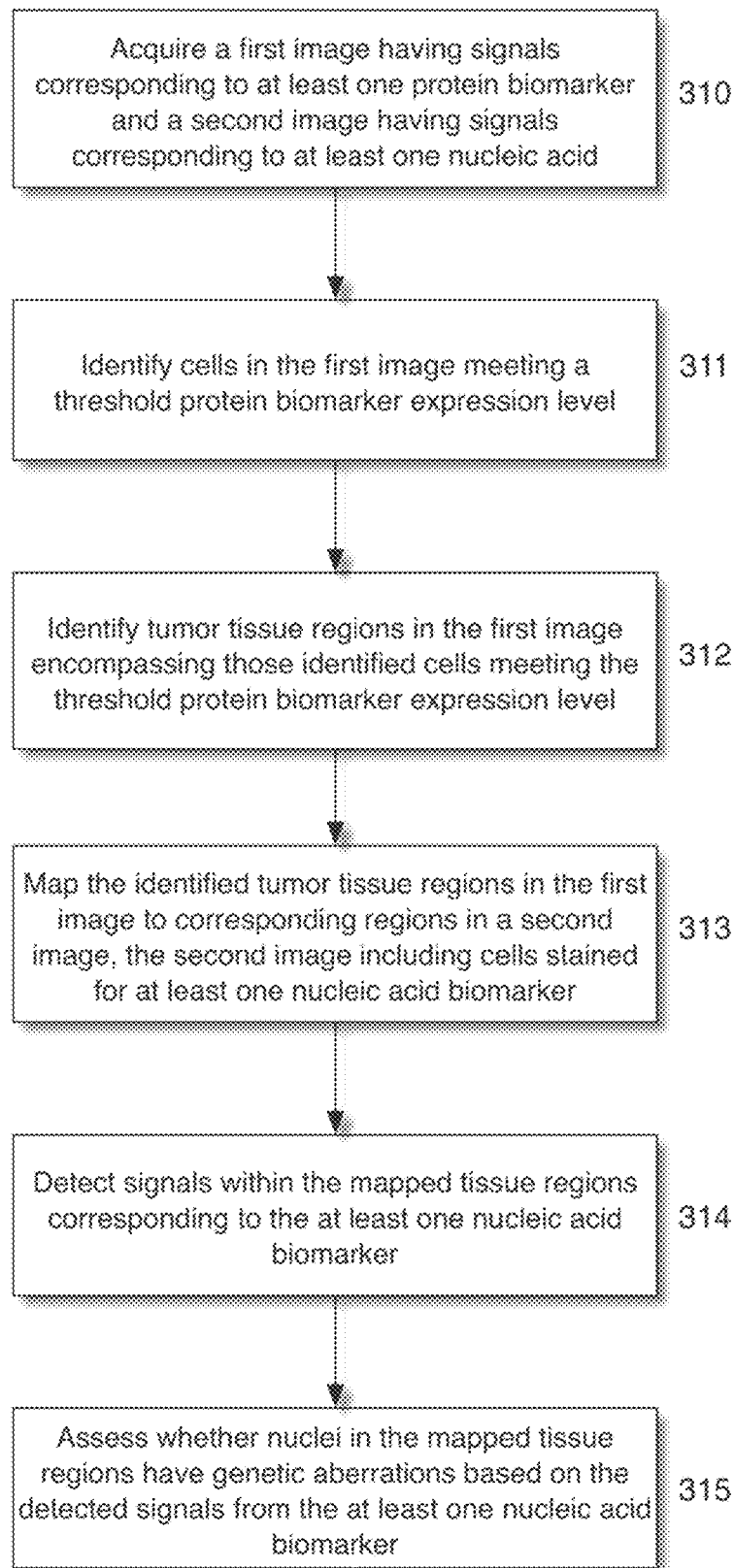
FIG. 3 sets forth a flow chart illustrating a method of detecting genetic aberrations within a biological sample in accordance with some embodiments of the present disclosure.
Figure 4:
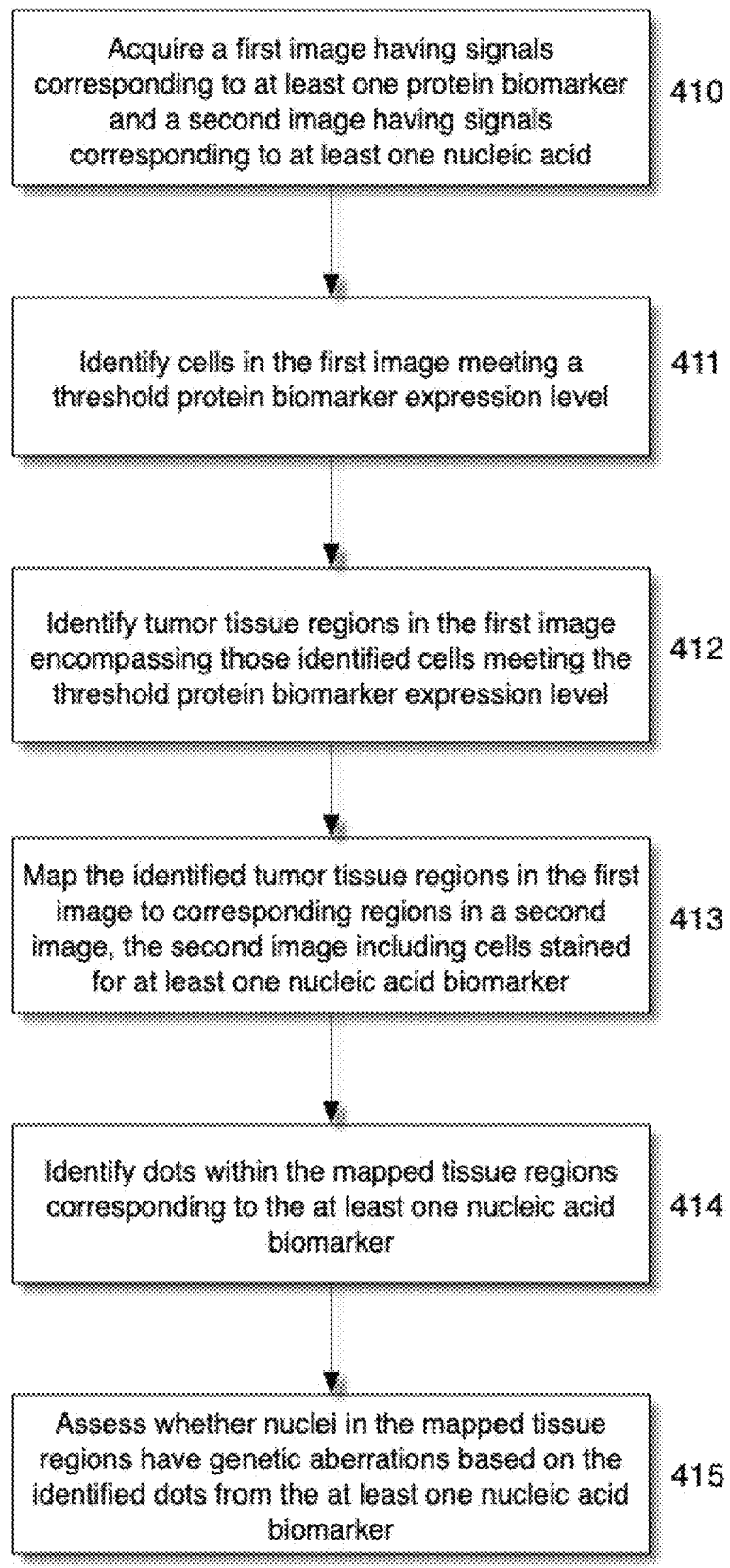
FIG. 4 sets forth a flow chart illustrating a method of detecting genetic aberrations within a biological sample in accordance with some embodiments of the present disclosure.
Figure 5:
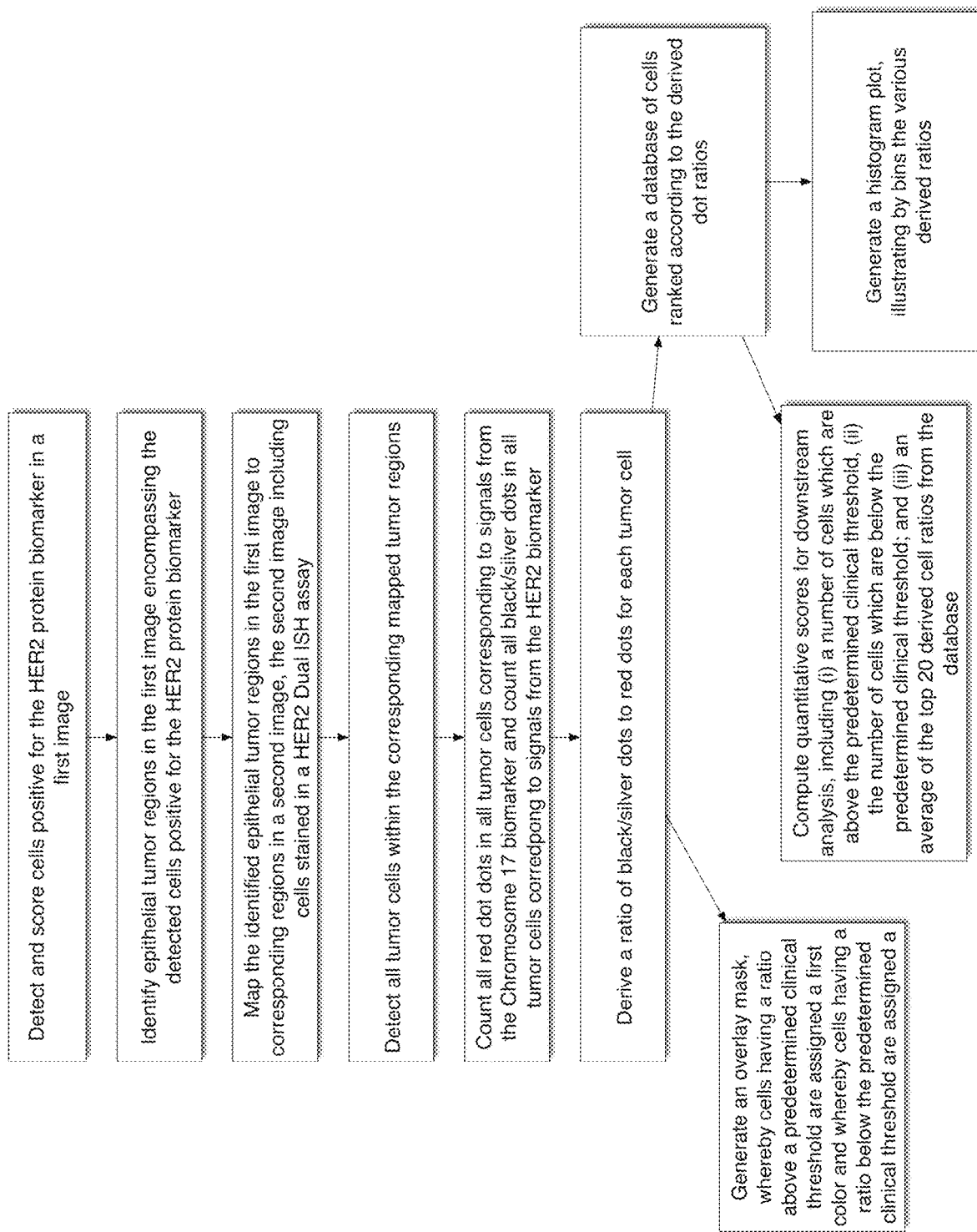
FIG. 5 sets forth a flow chart illustrating a method of predicting HER2 status in accordance with some embodiments of the present disclosure.

FIG. 2 provides an overview of the various modules utilized within the presently disclosed digital pathology system 200. In some embodiments, the digital pathology system 200 employs a computer device or computer-implemented method having one or more processors 220 and at least one memory 201, the at least one memory 201 storing non-transitory computer-readable instructions for execution by the one or more processors to cause the one or more processors (220) to execute instructions (or stored data) in one or more modules (e.g. modules 202 through 210).

Again with reference to FIG. 2, in some embodiments, the system may include: (a) an imaging module 202 adapted to generate image data of a stained biological sample, e.g. a first image stained for the presence of one or more protein biomarkers and a second image stained for the presence of one or more nucleic acid biomarkers; (b) an unmixing module 203 to unmix acquired images having more than one stain into individual channel images; (c) a cell detection and classification module 204 to detect and classify stained cells, such as cells stained for a nuclear or membrane protein biomarker; (d) a scoring module 205 to evaluate staining intensity and/or to derive an expression score; (e) a tissue region identification module 206 to identify different tissue regions, such as tumor tissue regions; (f) an image registration module 207 to map regions in a first image to corresponding regions in a second image; (g) a dot detection module 208 to identify signals corresponding to one or more nucleic acid biomarkers; (h) a dot classification module 209 to classify the identified signals as corresponding to a particular nucleic acid biomarker; (i) a dot counting and sorting module 210 for returning a total count of all detected and classified dots within a cell or nucleus; and (j) a visualization module 211 for generating overlay images or certain graphs (e.g. binned histogram plots) based on the counted dots and any data derived therefrom. Each of these modules will be described in greater detail herein.

With reference to FIGS. 2-5, the present disclosure provides a computer-implemented system and method of assessing whether cells within images of a biological sample stained for the presence of one or more biomarkers have genetic aberrations, such as abnormally high copy numbers of genes, certain chromosomal abnormalities, etc. In some embodiments, the system runs a plurality of modules (e.g. modules 204 and 205) to identify cells in a first image stained for the presence of one or more biomarkers that meet predetermined protein biomarker expression levels, e.g. a predetermined minimum staining intensity level (step 311). For example, and in the context of the HER2 protein biomarker, those stained cells meeting a minimum membrane staining intensity level are identified using modules 204 and 205. Following this example, and depending on the minimum threshold established, the cells meeting the minimum membrane staining intensity level are likely to demonstrate an abnormal HER2 gene status.

Subsequently, tissue regions, e.g. tumor tissue regions, in the first image encompassing the identified cells meeting the predetermined protein biomarker expression levels are identified (step 312; see also step 412) (such as with a tissue region identification module 206). Continuing the example above in the context of HER2, epithelial tumor tissue regions encompassing the identified cells meeting the minimum membrane staining intensity threshold are derived. It is believed that cells having genetic aberrations are likely to be found in these identified tumor tissue regions.

In some embodiments, the identified tissue regions are then mapped from the first image to corresponding regions in the second image (step 313; see also step 413) (such as using the image registration module 207). For example, if the first image is of a first tissue serial section, and the second image is of a second tissue serial section, the image registration technique allows structures, objects, or regions identified in the first image to be identified in the corresponding second image. In the context of the above example, those identified epithelial tumor tissue regions from the first image are carried over to the second image after image registration is performed. In this way, cells within the second image belonging to identified epithelial tumor tissue regions may be analyzed for genetic aberrations.

Next, signals corresponding to one or more nucleic acid biomarkers are detected and/or quantified in the mapped tissue regions using a plurality of modules (e.g. modules 208, 209, and 210) (step 314; see also step 414). In some embodiments, the signals corresponding to one or more nucleic acid biomarkers are dots or dot blobs. The detected and/or quantified signals may then be used to assess whether nuclei (e.g. tumor nuclei) in the mapped tissue regions have genetic aberrations, such as a high copy number or a chromosomal abnormality (step 315; see also step 415). In the context of the HER2 example, nuclei within the identified and registered epithelial tumor tissue regions having, for example, normal gene copy and ploidy status (2 signals of HER2 and 2 signals for chromosome 17); HER 2 amplification; chromosome 17 polysomy; and/or chromosome 17 polysomy with HER2 amplification.

Subsequently, the assessments made (step 315; see also step 415) may be visualized using visualization module 211 or may be stored in a database 240 (e.g. store an assessment of an individual nucleus and its location; store an assessment of an entire mapped tissue region; etc.). For example, an overlay may be generated and then superimposed onto a whole slide image or any portion thereof. In the context of HER2, and by way of example only, those cells having a ratio of black dots to red dots of greater than 2 may be visualized as having one color, while those cells having a ratio of 2 or less than 2 may be visualized as having a second, different color. Likewise, a binned histogram plot of calculated ratios may be generated for storage or output.

The skilled artisan will also appreciate that additional modules or databases not depicted in FIG. 2 may be incorporated into the workflow. For example, an image pre-processing module may be run to apply certain filters to the acquired images or to identify certain histological and/or morphological structures within the tissue samples. In addition, a region of interest selection module may be utilized to select a particular portion of an image for analysis.

Image Acquisition Module

In some embodiments, and with reference to FIG. 2, the digital pathology system 200 runs an imaging module 202 to capture images or image data (such as from a scanning device 12) of a biological sample having one or more stains (step 310; see also step 410). In some embodiments, the images received or acquired are RGB images or multispectral images (e.g. multiplex brightfield and/or dark field images). In some embodiments, the images captured are stored in memory 201.

The images or image data (used interchangeably herein) may be acquired using the scanning device 12, such as in real-time. In some embodiments, the images are acquired from a microscope or other instrument capable of capturing image data of a specimen-bearing microscope slide, as noted herein. In some embodiments, the images are acquired using a 2D scanner, such as one capable of scanning image tiles, or a line scanner capable of scanning the image in a line-by-line manner, such as the VENTANA DP 200 scanner. Alternatively, the images may be images that have been previously acquired (e.g. scanned) and stored in one or more memories 201 (or, for that matter, retrieved from a server via network 20).

In some embodiments, the images received as input are whole slide images. In other embodiments, the images received as input are portions of a whole slide image. In some embodiments, a whole slide image is broken down into several portions, e.g. tiles, and each portion or tile may be independently analyzed (e.g. using the modules set forth in FIG. 2 and the methods illustrated in at least FIGS. 3 and 4). After the portions or tiles are independently analyzed, the data from each portion or tile may be stored independently and/or reported at the whole slide level.

The biological sample may be stained through application of one or more stains, and the resulting image or image data comprises signals corresponding to each of the one or more stains. In some embodiments, the input images are simplex images having only a single stain (e.g., stained with 3,3'-diaminobenzidinc (DAB)). In some embodiments, the biological sample may be stained in a multiplex assay for two or more stains (thus providing multiplex images). In some embodiments, the biological samples are stained for at least two biomarkers. In other embodiments, the biological samples are stained for the presence of at least two biomarkers and also stained with a primary stain (e.g. hematoxylin). In some embodiments, the biological samples are stained for the presence of at least one protein biomarker and at least two nucleic acid biomarkers (e.g. DNA, RNA, microRNAs, etc.).

In some embodiments, the biological samples are stained in an immunohistochemistry assay for the presence of one or more protein biomarkers. For example, the biological sample may be stained for the presence of a human epidermal growth factor receptor 2 protein (HER2 protein). Currently in the United States, there are two Food and Drug Administration (FDA) approved methods for HER2 assessment: HerceptTest™ (DAKO, Glostrup Denmark) and HER2/neu (4B5) rabbit monoclonal primary antibody (Ventana, Tucson, Arizona).

In other embodiments, the biological sample is stained for the presence of estrogen receptor (ER), progesterone receptor (PR), or Ki-67. In yet other embodiments, the biological sample is stained for the presence of EGFR or HER3. Examples of other protein biomarkers are described by Zamay et. al., "Current and Prospective Biomarkers of Long Cancer," Cancers (Basel), 2018 November; 9(11), the disclosure of which is hereby incorporated by reference herein in its entirety. Examples of protein biomarkers described by Zamay include CEACAM, CYFRA21-1, PKLK, VEGF, BRAF, and SCC.

In other embodiments, the biological samples are stained in an in situ hybridization (ISH) assay for the presence of one or more nucleic acids, including mRNA. U.S. Pat. No. 7,087,379 (the disclosure of which is hereby incorporated by reference herein in its entirety) describes methods of staining samples with ISH probes such that individual spots (or dots), representing single gene copies, may be observed and detected. In some embodiments, several target genes are simultaneously analyzed by exposing a cell or tissue sample to a plurality of nucleic acid probes that have been labeled with a plurality of different nucleic acid tags.

For example, the INFORM HER2 DUAL ISH DNA Probe Cocktail Assay from Ventana Medical Systems, Inc. (Tucson, AZ), is intended to determine HER2 gene status by enumeration of the ratio of the HER2 gene to Chromosome 17. The HER2 and Chromosome 17 probes are detected using two-color chromogenic in situ hybridization on formalin-fixed, paraffin-embedded tissue samples, such as human breast cancer tissue specimens or human gastric cancer tissue specimens. For the HER2 Dual ISH assay, the signals are silver signals ("black signals") and red signals, corresponding to black dots and red dots, respectively, in an input image. For the HER2 Dual ISH assay, cell-based scoring involves counting of red and black dots inside selected cells, where the HER2 gene expression is expressed through black dots and Chromosome-17 is expressed through red dots.

Figure 7A:
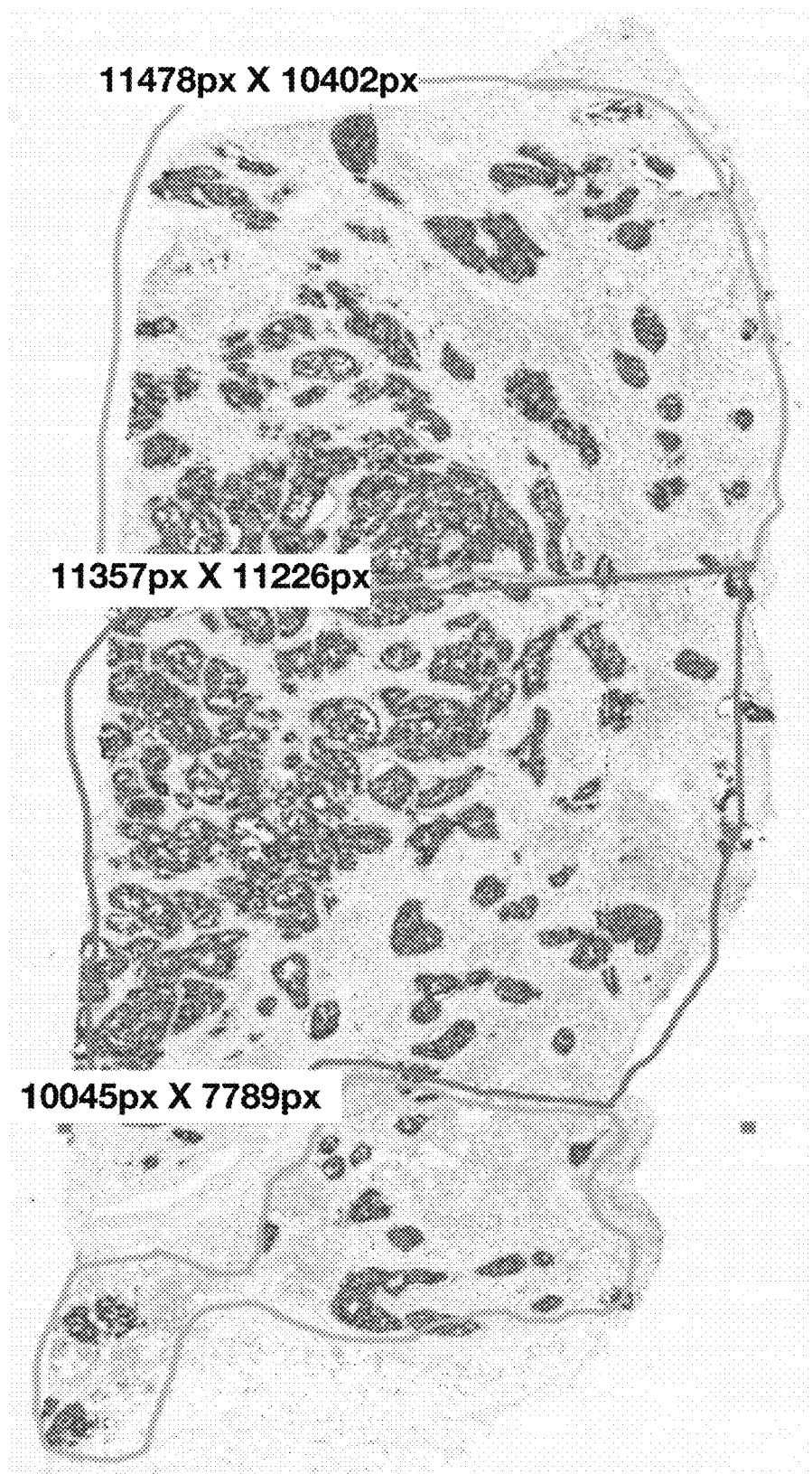
FIG. 7A illustrates a first slide stained for the presence of a HER2 protein biomarker.
Figure 7B:
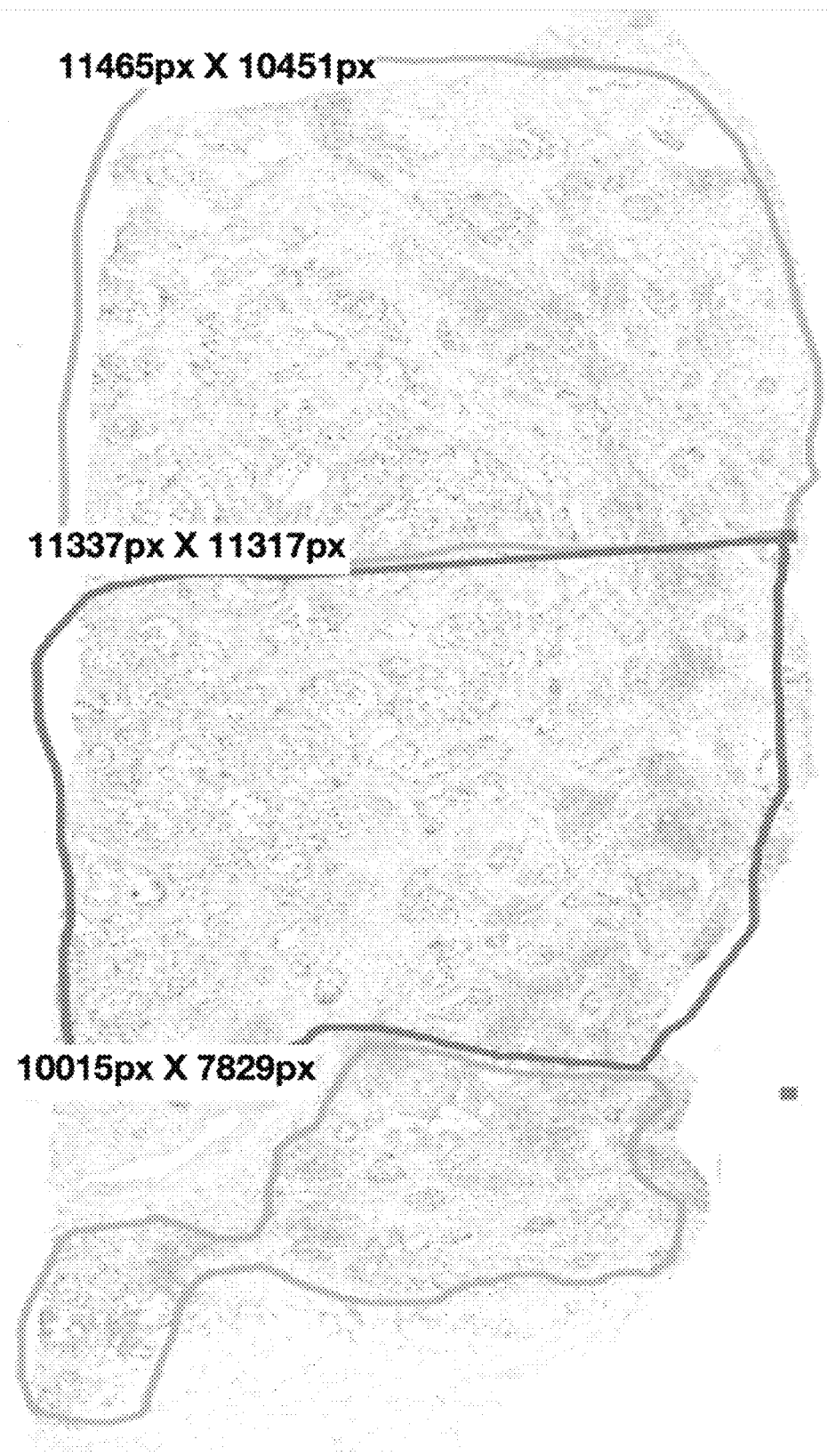
FIG. 7B illustrates a second slide stained for the presence of a HER2 nucleic acid biomarker and a Chromosome 17 nucleic acid biomarker.

In some embodiments, the biological samples are stained for at least the HER2 protein biomarker, and for the HER2 and Chromosome 17 nucleic acid biomarkers. In some embodiments, the biological samples are stained for at least the HER2 protein biomarker, for the HER2 and Chromosome 17 nucleic acid biomarkers, and for at least one additional protein biomarker (e.g. ER, PR, Ki-67, etc.). For example, a first serial tissue section may be stained for the HER2 protein biomarker (and optionally other protein biomarkers) and a second serial tissue section may be stained using the HER2 DUAL ISH probe cocktail (see, e.g., FIGS. 7A and 7B). In other embodiments, the biological samples are stained for at least the EGFR protein biomarker, and for the EGFR/CEP nucleic acid biomarkers.

Chromogenic stains may comprise Hematoxylin, Eosin, Fast Red, or 3,3'-Diaminobenzidine (DAB). In some embodiments, the tissue sample is stained with a primary stain (e.g. hematoxylin). In some embodiments, the tissue sample is also stained with a secondary stain (e.g. eosin). In some embodiments, the tissue sample is stained in an IHC assay for a particular biomarker. Of course, the skilled artisan will appreciate that any biological sample may also be stained with one or more fluorophores.

A typical biological sample is processed in an automated staining/assay platform that applies a stain to the sample. There are a variety of commercial products on the market suitable for use as the staining/assay platform, one example being the Discovery™ product of Ventana Medical Systems, Inc. (Tucson, AZ). The camera platform may also include a bright field microscope, such as the VENTANA iScan HT or the VENTANA DP 200 scanners of Ventana Medical Systems, Inc., or any microscope having one or more objective lenses and a digital imager. Other techniques for capturing images at different wavelengths may be used. Further camera platforms suitable for imaging stained biological specimens are known in the art and commercially available from companies such as Zeiss, Canon, Applied Spectral Imaging, and others, and such platforms are readily adaptable for use in the system, methods and apparatus of this subject disclosure.

In some embodiments, the input images are masked such that only tissue regions are present in the images. In some embodiments, a tissue region mask is generated to mask non-tissue regions from tissue regions. In some embodiments, a tissue region mask may be created by identifying the tissue regions and automatically or semi-automatically (i.e., with minimal user input) excluding the background regions (e.g. regions of a whole slide image corresponding to glass with no sample, such as where there exists only white light from the imaging source). The skilled artisan will appreciate that in addition to masking non-tissue regions from tissue regions, the tissue masking module may also mask other areas of interest as needed, such as a portion of a tissue identified as belonging to a certain tissue type or belonging to a suspected tumor region. In some embodiments, a segmentation technique is used to generate the tissue region masked images by masking tissue regions from non-tissue regions in the input images. Suitable segmentation techniques are as such known from the prior art, (cf. Digital Image Processing, Third Edition, Rafael C. Gonzalez, Richard E. Woods, chapter 10, page 689 and Handbook of Medical Imaging, Processing and Analysis, Isaac N. Bankman Academic Press, 2000, chapter 2). In some embodiments, an image segmentation technique is utilized to distinguish between the digitized tissue data and the slide in the image, the tissue corresponding to the foreground and the slide corresponding to the background. In some embodiments, the component computes the Area of Interest (AOI) in a whole slide image in order to detect all tissue regions in the AOI while limiting the amount of background non-tissue area that is analyzed. A wide range of image segmentation techniques (e.g., HSV color-based image segmentation, Lab image segmentation, mean-shift color image segmentation, region growing, level set methods, fast marching methods, etc.) can be used to determine, for example, boundaries of the tissue data and non-tissue or background data. Based at least in part on the segmentation, the component can also generate a tissue foreground mask that can be used to identify those portions of the digitized slide data that correspond to the tissue data. Alternatively, the component can generate a background mask used to identify those portions of the digitized slide date that do not correspond to the tissue data.

This identification may be enabled by image analysis operations such as edge detection, etc. A tissue region mask may be used to remove the non-tissue background noise in the image, for example the non-tissue regions. In some embodiments, the generation of the tissue region mask comprises one or more of the following operations (but not limited to the following operations): computing the luminance of the low resolution analysis input image, producing a luminance image, applying a standard deviation filter to the luminance image, producing a filtered luminance image, and applying a threshold to filtered luminance image, such that pixels with a luminance above a given threshold are set to one, and pixels below the threshold are set to zero, producing the tissue region mask. Additional information and examples relating to the generation of tissue region masks is disclosed in US Publication No. 2017/0154420, entitled "An Image Processing Method and System for Analyzing a Multi-Channel Image Obtained from a Biological Tissue Sample Being Stained by Multiple Stains," the disclosure of which is hereby incorporated by reference herein in its entirety.

Unmixing Module

In some embodiments, the images received as input may be multiplex images, i.e. the image received is of a biological sample stained with more than one stain (e.g. an image stained for the presence of the HER2 and Chromosome 17 probes; an image stained for the presence of protein biomarkers or nucleic acid biomarkers). In these embodiments, and prior to further processing, the multiple image is first unmixed into its constituent channels, such as with an unmixing module 203, where each unmixed channel corresponds to a particular stain or signal.

In some embodiments, in a sample comprising one or more stains individual images may be produced for each channel of the one or more stains. The skilled artisan will appreciate that features extracted from these channels are useful in describing the different biological structures present within any image of a tissue (e.g. nuclei, membranes, cytoplasm, nucleic acids, etc.).

For example, and in the context of the HER2 DUAL ISH probes described herein, unmixing would result in a first unmixed image channel image having silver (or black) signals (corresponding to black dots), a second unmixed image channel image having red signals (corresponding to red dots), and a third unmixed image channel having hematoxylin signals. Each of these unmixed black dot and red dot images may be used as input for the dot detection and classification modules described herein. Likewise, and by way of another non-limiting example, an input image stained for the presence of two protein biomarkers (e.g. HER2 and Ki-67) would be unmixed into a first image channel image having signals corresponding to HER2 (e.g. DAB membrane staining) and a second image channel image having signals corresponding to Ki-67. Again, the HER2 protein biomarker image and the Ki-67 protein biomarker image may be used as input images for cell detection and classification as described herein.

In some embodiments, the multi-spectral image provided by the imaging module 202 is a weighted mixture of the underlying spectral signals associated the individual biomarkers and noise components. At any particular pixel, the mixing weights are proportional to the biomarker expressions of the underlying co-localized biomarkers at the particular location in the tissue and the background noise at that location. Thus, the mixing weights vary from pixel to pixel. The spectral unmixing methods disclosed herein decompose the multi-channel pixel value vector at each and every pixel into a collection of constituent biomarker end members or components and estimate the proportions of the individual constituent stains for each of the biomarkers.

Unmixing is the procedure by which the measured spectrum of a mixed pixel is decomposed into a collection of constituent spectra, or endmembers, and a set of corresponding fractions, or abundances, that indicate the proportion of each endmember present in the pixel. Specifically, the unmixing process can extract stain-specific channels to determine local concentrations of individual stains using reference spectra that are well known for standard types of tissue and stain combinations. The unmixing may use reference spectra retrieved from a control image or estimated from the image under observation. Unmixing the component signals of each input pixel enables retrieval and analysis of stain-specific channels, such as a hematoxylin channel and an eosin channel in H&E images, or a diaminobenzidine (DAB) channel and a counterstain (e.g., hematoxylin) channel in IHC images. The terms "unmixing" and "color deconvolution" (or "deconvolution") or the like (e.g. "deconvolving," "unmixed") are used interchangeably in the art.

In some embodiments, the multiplex images are unmixed with unmixing module 205 using liner unmixing. Linear unmixing is described, for example, in 'Zimmermann "Spectral Imaging and Linear Unmixing in Light Microscopy" Adv Biochem Engin/Biotechnology (2005) 95:245-265' and in in C. L. Lawson and R. J. Hanson, "Solving least squares Problems," PrenticeHall, 1974, Chapter 23, p. 161,' the disclosures of which are incorporated herein by reference in their entirety. In linear stain unmixing, the measured spectrum (S(X)) at any pixel is considered a linear mixture of stain spectral components and equals the sum of the proportions or weights (A) of each individual stain's color reference (R00) that is being expressed at the pixel $$S(\lambda) = A_1 \cdot R_1(\lambda) + A_2 \cdot R_2(\lambda) + A_3 \cdot R_3(\lambda) \ldots A_i ry(\lambda)$$

which can be more generally expressed as in matrix form as $$S(\lambda) = \sum A_i ry(\lambda) \text{ or } S = R \cdot A$$

By way of example, if there are M channels images acquired and N individual stains, the columns of the M x N matrix R are the optimal color system as derived herein, the N×1 vector A is the unknown of the proportions of individual stains and the M×1 vector S is the measured multichannel spectral vector at a pixel. In these equations, the signal in each pixel (S) is measured during acquisition of the multiplex image and the reference spectra, i.e. the optimal color system, is derived as described herein. The contributions of various stains ($A_i$) can be determined by calculating their contribution to each point in the measured spectrum. In some embodiments, the solution is obtained using an inverse least squares fitting approach that minimizes the square difference between the measured and calculated spectra by solving the following set of equations, $$\left[\partial \sum_j \{S(\lambda_j) - \sum_i A_i ry(\lambda_j)\}2\right]/\partial A_i = 0$$

In this equation, j represents the number of detection channels and i equals the number of stains. The linear equation solution often involves allowing a constrained unmixing to force the weights (A) to sum to unity.

In other embodiments, unmixing is accomplished using the methods described in WO2014/195193, entitled "Image Adaptive Physiologically Plausible Color Separation," filed on May 28, 2014, the disclosure of which is hereby incorporated by reference in its entirety herein. In general, WO2014/195193 describes a method of unmixing by separating component signals of the input image using iteratively optimized reference vectors. In some embodiments, image data from an assay is correlated with expected or ideal results specific to the characteristics of the assay to determine a quality metric. In the case of low quality images or poor correlations against ideal results, one or more reference column vectors in matrix R are adjusted, and the unmixing is repeated iteratively using adjusted reference vectors, until the correlation shows a good quality image that matches physiological and anatomical requirements. The anatomical, physiological, and assay information may be used to define rules that are applied to the measured image data to determine the quality metric. This information includes how the tissue was stained, what structures within the tissue were intended or not intended to be stained, and relationships between structures, stains, and markers specific to the assay being processed. An iterative process results in stain-specific vectors that can generate images that accurately identify structures of interest and biologically relevant information, are free from any noisy or unwanted spectra, and therefore fit for analysis. The reference vectors are adjusted to within a search space. The search space defines a range of values that a reference vector can take to represent a stain. The search space may be determined by scanning a variety of representative training assays including known or commonly occurring problems and determining high-quality sets of reference vectors for the training assays.

Protein Biomarker Detection

After one or more images are acquired (step 310; see also step 410), such as from serial tissue sections, using the imaging module 202 (and optionally unmixed using the unmixing module 203), cells are identified in the acquired image (or unmixed image channel image) that meet predetermined criteria, e.g. a threshold protein biomarker expression level (step 311; see also step 411). In some embodiments, cells stained for the presence of a protein biomarker may be detected and classified using the cell detection and classification module 204. Following detection and classification, a staining intensity level or an expression level may be derived such as with the scoring module 205. The identified cells meeting the predetermined criteria are then utilized to identify tissue regions, e.g. tumor tissue regions.

Figure 8A:
FIG. 8A illustrates a slide stained for the presence of a HER2 protein biomarker.
Figure 8B:
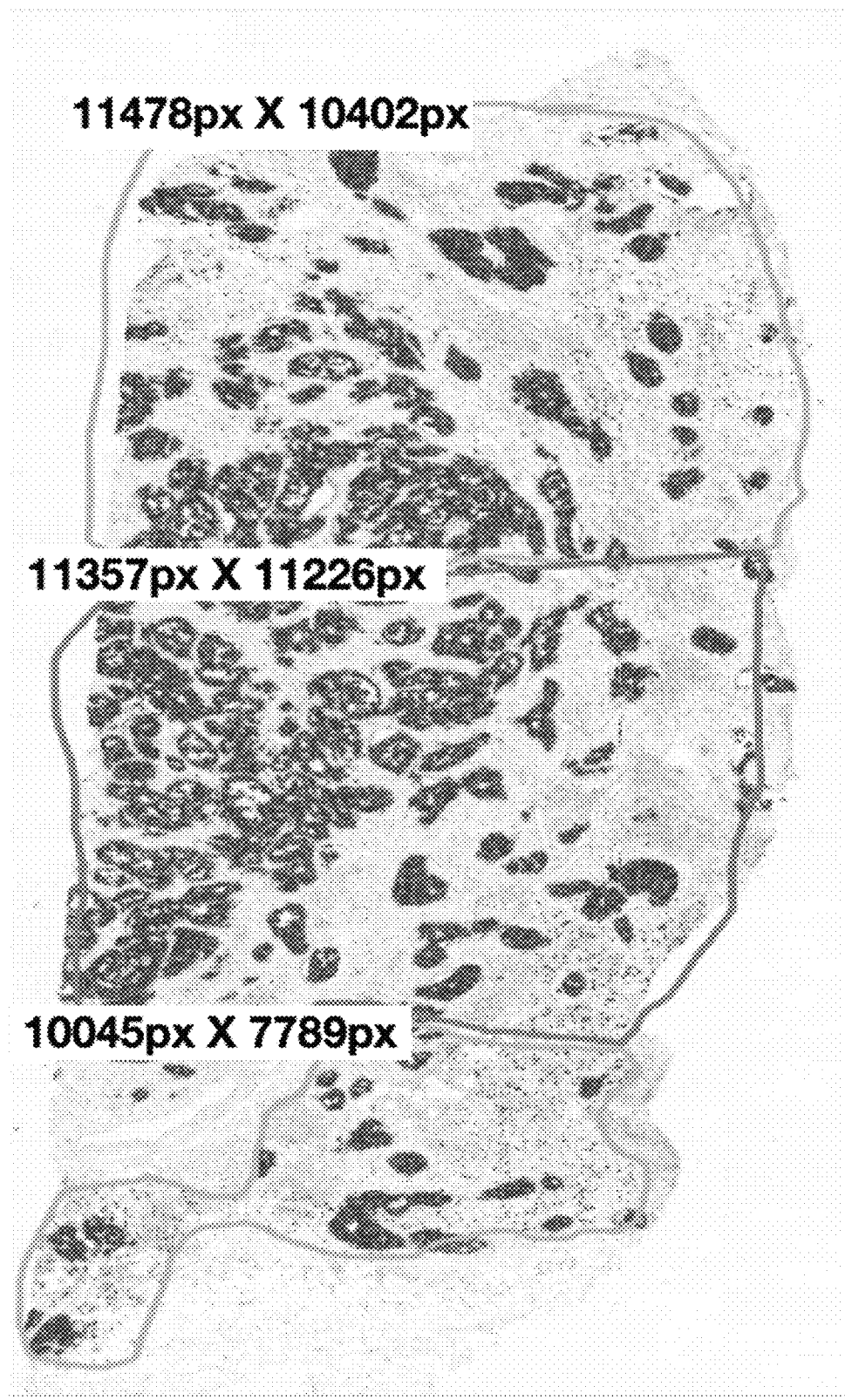
FIG. 8B also illustrates the result of image analysis for membrane staining features.
Figure 9:
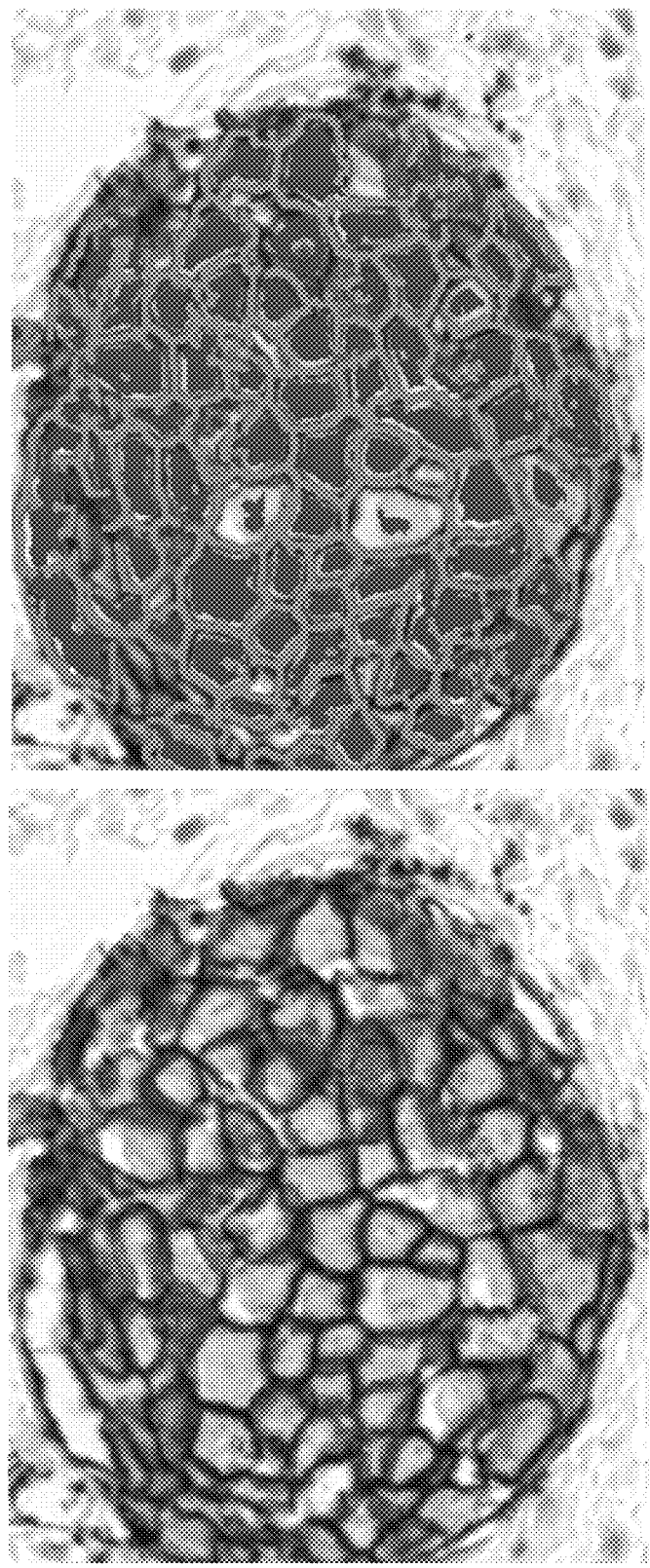
FIG. 9 illustrates a close-up view of a sample stained for the presence of the HER2 protein biomarker both before (bottom) and after (top) HER2 image analysis.

For example, and in the context of a sample stained for the presence of the HER2 protein biomarker, cell membranes expressing the HER2 protein may be detected, classified, and/or scored (see, e.g., FIGS. 8B, 9A, and 9B). In some embodiments, each detected and classified cell may then be evaluated such that a staining intensity level may be determined. In other embodiments, membrane staining may be evaluated and scored (e.g. 0, +1, +2, or +3) by an automated scoring algorithm. By way of example, those detected cells meeting a minimum threshold staining intensity or score may be identified and used to determined tumor tissue regions (see FIGS. 8 and 9).

Automated Cell Detection and Classification Modul

Following image acquisition and/or unmixing, input images or unmixed image channel images are provided to a cell detection and classification module 204 to automatically detect, identify, and/or classify cells and/or nuclei. The procedures and automated algorithms described herein may be adapted to identify and classify various types of cells or cell nuclei based on features within the input images, including identifying and classifying tumor cells, non-tumor cells, stroma cells, and lymphocytes.

The skilled artisan will appreciate that the nucleus, cytoplasm and membrane of a cell have different characteristics and that differently stained tissue samples may reveal different biological features. Indeed, the skilled artisan will appreciate that certain cell surface receptors can have staining patterns localized to the membrane or localized to the cytoplasm. Thus, a "membrane" staining pattern is analytically distinct from a "cytoplasmic" staining pattern. Likewise, a "cytoplasmic" staining pattern and a "nuclear" staining pattern are analytically distinct. Each of these distinct staining patterns may be used as features for identifying cells and/or nuclei.

Methods of identifying, classifying, and/or scoring nuclei, cell membranes, and cell cytoplasm in images of biological samples having one or more stains are described in U.S. Pat. No. 7,760,927, the disclosure of which is hereby incorporated by reference herein in its entirety. For example, U.S. Pat. No. 7,760,927 describes an automated method for simultaneously identifying a plurality of pixels in an input image of a biological tissue stained with a biomarker, including considering a first color plane of a plurality of pixels in a foreground of the input image for simultaneous identification of cell cytoplasm and cell membrane pixels, wherein the input image has been processed to remove background portions of the input image and to remove counterstained components of the input image; determining a threshold level between cell cytoplasm and cell membrane pixels in the foreground of the digital image; and determining simultaneously with a selected pixel and its eight neighbors from the foreground if the selected pixel is cell cytoplasm pixel, a cell membrane pixel or a transitional pixel in the digital image using the determined threshold level.

Suitable systems and methods for automatically identifying biomarker-positive cells in an image of a biological sample are also described in United States Patent Publication No. 2017/0103521, the disclosure of which is hereby incorporated by reference herein in its entirety. For example, US2017/0103521 describes (i) reading a first digital image and a second digital image into one or more memories, the first and second digital images depicting the same area of a first slide, the first slide comprising multiple tumor cells having been stained with a first stain and with a second stain; (ii) identifying a plurality of nuclei and positional information of the nuclei by analyzing light intensities in the first digital image; (iii) identifying cell membranes which comprise the biomarker by analyzing light intensities in the second digital image and by analyzing positional information of the identified nuclei; and (iv) identifying biomarker-positive tumor cells in an area, wherein a biomarker-positive tumor cell is a combination of one identified nucleus and one identified cell membrane that surrounds the identified nucleus. Methods of detecting staining with the HER2 protein biomarker or the EGFR protein biomarker are further disclosed within US2017/0103521.

In some embodiments, tumor nuclei are automatically identified by first identifying candidate nuclei and then automatically distinguishing between tumor nuclei and non-tumor nuclei. Numerous methods of identifying candidate nuclei in images of tissue are known in the art. For example, automatic candidate nucleus detection can be performed by applying a radial symmetry-based method, such as on the Hematoxylin image channel or a biomarker image channel after unmixing (see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein).

More specifically, in some embodiments the images received as input are processed such as to detect nucleus centers (seeds) and/or to segment the nuclei. For example, instructions may be provided to detect nucleus centers based on radial-symmetry voting using the techniques of Parvin (noted above). In some embodiments, nuclei are detected using radial symmetry to detect centers of nuclei and then the nuclei are classified based on the intensity of stains around the cell centers. In some embodiments, a radial symmetry-based nuclei detection operation is used as described in commonly-assigned and co-pending patent application WO/2014/140085A1, the entirety of which is incorporated herein by reference. For example, an image magnitude may be computed within an image and one or more votes at each pixel are accumulated by adding the summation of the magnitude within a selected region. Mean shift clustering may be used to find the local centers in the region, with the local centers representing actual nuclear locations. Nuclei detection based on radial symmetry voting is executed on color image intensity data and makes explicit use of the a priori domain knowledge that the nuclei are elliptical shaped blobs with varying sizes and eccentricities. To accomplish this, along with color intensities in the input image, image gradient information is also used in radial symmetry voting and combined with an adaptive segmentation process to precisely detect and localize the cell nuclei. A "gradient" as used herein is, for example, the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. For instance, nuclei seed detection involves defining a seed as a point which is assumed to lie inside a cell nucleus and serve as the starting point for localizing the cell nuclei. The first step is to detect seed points associated with each cell nuclei using a highly robust approach based on the radial symmetry to detect elliptical-shaped blobs, structures resembling cell nuclei. The radial symmetry approach operates on the gradient image using a kernel-based voting procedure. A voting response matrix is created by processing each pixel that accumulates a vote through a voting kernel. The kernel is based on the gradient direction computed at that particular pixel and an expected range of minimum and maximum nucleus size and a voting kernel angle (typically in the range $[\pi/4, \pi/8]$). In the resulting voting space, local maxima locations that have a vote value higher than a predefined threshold value are saved out as seed points. Extraneous seeds may be discarded later during subsequent segmentation or classification processes. Other methods are discussed in US Patent Publication No. 2017/0140246, the disclosure of which is incorporated by reference herein.

Nuclei may be identified using other techniques known to those of ordinary skill in the art. For example, an image magnitude may be computed from a particular image channel of one of the H&E or IHC images, and each pixel around a specified magnitude may be assigned a number of votes that is based on a summation of the magnitude within a region around the pixel. Alternatively, a mean shift clustering operation may be performed to find the local centers within a voting image, which represents the actual location of the nucleus. In other embodiments, nuclear segmentation may be used to segment the entire nucleus based on the now-known centers of the nuclei via morphological operations and local thresholding. In yet other embodiments, model-based segmentation may be utilized to detect nuclei (i.e. learning the shape model of the nuclei from a training data set and using that as the prior knowledge to segment the nuclei in the testing image).

In some embodiments, the nuclei are then subsequently segmented using thresholds individually computed for each nucleus. For example, Otsu's method may be used for segmentation in a region around an identified nucleus since it is believed that the pixel intensity in the nuclear regions varies. As will be appreciated by those of ordinary skill in the art, Otsu's method is used to determine an optimal threshold by minimizing the intra-class variance and is known to those of skill in the art. More specifically, Otsu's method is used to automatically perform clustering-based image thresholding or, the reduction of a gray level image to a binary image. The algorithm assumes that the image contains two classes of pixels following a bi-modal histogram (foreground pixels and background pixels). It then calculates the optimum threshold separating the two classes such that their combined spread (intra-class variance) is minimal, or equivalent (because the sum of pairwise squared distances is constant), so that their inter-class variance is maximal.

In some embodiments, the systems and methods further comprise automatically analyzing spectral and/or shape features of the identified nuclei in an image for identifying nuclei of non-tumor cells. For example, blobs may be identified in the first digital image in a first step. A "blob" as used herein can be, for example, a region of a digital image in which some properties, e.g. the intensity or grey value, are constant or vary within a prescribed range of values. All pixels in a blob can be considered in some sense to be similar to each other. For example, blobs may be identified using differential methods which are based on derivatives of a function of position on the digital image, and methods based on local extrema. A nuclear blob is a blob whose pixels and/or whose outline shape indicate that the blob was probably generated by a nucleus stained with the first stain. For example, the radial symmetry of a blob could be evaluated to determine if the blob should be identified as a nuclear blob or as any other structure, e.g. a staining artifact. For example, in case a blob has a lengthy shape and is not radially symmetric, said blob may not be identified as a nuclear blob but rather as a staining artifact. Depending on the embodiment, a blob identified to be a "nuclear blob" may represent a set of pixels which are identified as candidate nuclei, and which may be further analyzed for determining if said nuclear blob represents a nucleus. In some embodiments, any kind of nuclear blob is directly used as an "identified nucleus." In some embodiments, filtering operations are applied on the identified nuclei or nuclear blobs for identifying nuclei which do not belong to biomarker-positive tumor cells and for removing said identified non-tumor nuclei from the list of already identified nuclei or not adding said nuclei to the list of identified nuclei from the beginning. For example, additional spectral and/or shape features of the identified nuclear blob may be analyzed to determine if the nucleus or nuclear blob is a nucleus of a tumor cell or not. For example, the nucleus of a lymphocyte is larger than the nucleus of other tissue cell, e.g. of a lung cell. In case the tumor cells are derived from a lung tissue, nuclei of lymphocytes are identified by identifying all nuclear blobs of a minimum size or diameter which is significantly larger than the average size or diameter of a normal lung cell nucleus.

The identified nuclear blobs relating to the nuclei of lymphocytes may be removed (i.e., "filtered out from") the set of already identified nuclei. By filtering out the nuclei of non-tumor cells, the accuracy of the method may be increased. Depending on the biomarker, also non-tumor cells may express the biomarker to a certain extent and may therefore produce an intensity signal in the first digital image which does not stem from a tumor cell. By identifying and filtering out nuclei which do not belong to tumor cells from the totality of the already identified nuclei, the accuracy of identifying biomarker-positive tumor cells may be increased. These and other methods are described in US Patent Publication 2017/0103521, the disclosure of which is incorporated by reference herein in its entirety. In some embodiments, once the seeds are detected, a locally adaptive thresholding method may be used, and blobs around the detected centers are created. In some embodiments, other methods may also be incorporated, such as marker-based watershed algorithms can also be used to identify the nuclei blobs around the detected nuclei centers. These and other methods are described in PCT Publication No. WO2016/120442, the disclosure of which is incorporated by reference herein in its entirety.

Following detection of the nuclei, features (or metrics) are derived from within the input image. The derivation of metrics from nuclear features are well known in the art and any nuclear features known may be used in the context of the present disclosure. Non-limiting examples of metrics that may be computed include:

(A) Metrics Derived from Morphology Features

A "morphology feature" as used herein is, for example, a feature being indicative of the shape or dimensions of a nucleus. Without wishing to be bound by any particular theory, it is believed that morphological features provide some vital information about the size and shape of a cell or its nucleus. For example, a morphology feature may be computed by applying various image analysis algorithms on pixels contained in or surrounding a nuclear blob or seed. In some embodiments, the morphology features include area, minor, and major axis lengths, perimeter, radius, solidity, etc. At the cellular level, such features are used to classify a nucleus as belonging to a healthy or diseased cell. At the tissue level, the statistics of these features over the tissue are exploited in the classification of a tissue as diseased or not.

(B) Metrics Derived from Color

In some embodiments, metrics derived from color include color ratios, R/(R+G+B). or color principal components. In other embodiments, metrics derived from color include local statistics of each of the colors (mean/median/variance/std dev) and/or color intensity correlations in a local image window.

(C) Metrics Derived from Intensity Features

The group of adjacent cells with certain specific property values is set up between the dark and the white shades of grey colored cells represented in a histopathological slide image. The correlation of the color feature defines an instance of the size class, thus this way the intensity of these colored cells determines the affected cell from its surrounding cluster of dark cells.

(D) Metrics Derived from Spatial Features

In some embodiments, spatial features include a local density of cells; average distance between two adjacent detected cells; and/or distance from a cell to a segmented region.

Of course, other features, as known to those of ordinary skill in the art, may be considered and used as the basis for computation of features.

In some embodiments, the cell detection and classification module 204 is run more than once. For example, the cell detection and classification module 204 is run a first time to extract features and classify cells and/or nuclei in a first image; and then run a second time to extract features and classify cells and/or nuclei in a series of addition images, where the additional images may be other simplex images or unmixed image channel images, or any combination thereof.

After features are derived, the feature may be used alone or in conjunction with training data (e.g. during training, example cells are presented together with a ground truth identification provided by an expert observer according to procedures known to those of ordinary skill in the art) to classify nuclei or cells. In some embodiments, the system can include a classifier that was trained based at least in part on a set of training or reference slides for each biomarker. The skilled artisan will appreciate that different sets of slides can be used to train a classifier for each biomarker. Accordingly, for a single biomarker, a single classifier is obtained after training. The skilled artisan will also appreciate that since there is variability between the image data obtained from different biomarkers, a different classifier can be trained for each different biomarker so as to ensure better performance on unseen test data, where the biomarker type of the test data will be known. The trained classifier can be selected based at least in part on how best to handle training data variability, for example, in tissue type, staining protocol, and other features of interest, for slide interpretation.

Scoring Module

The scoring module 205, in some embodiments, utilizes data acquired during the detection and classification of cells. For example, the cell detection and classification module 204 may comprise a series of image analysis algorithms and may be used to determine a presence of one or more of a nucleus, a cell wall, a tumor cell, or other structures within the identified cell clusters, as described herein. In some embodiments, derived stain intensity values and counts of specific nuclei for each field of view may be used to determine various marker expression scores, such as percent positivity or an H-Score Suitable methods of scoring are described in United States Patent Publication No. 2017/0103521, the disclosure of which is hereby incorporated by reference herein in its entirety.

By way of example, automated image analysis algorithms in the cell detection and classification module 204 may be used to interpret each one of the IHC slides in the series to detect tumor nuclei that are positive and negative stained for a particular biomarker, such as Ki67, ER, PR, HER2, etc. Based on the detected positive and negative tumor nuclei, various slide level scores such as marker percent positivity, H-scores, etc. may be computed using one or more methods.

In some embodiments, the expression score is an H-score. In some embodiments, the 'H' score is used to assess the percentage of tumor cells with cell membrane staining graded as 'weak,' moderate' or 'strong.' The grades are summated to give an overall maximum score of 300 and a cut-off point of 100 to distinguish between a 'positive' and 'negative.' For example, a membrane staining intensity (0, 1+, 2+, or 3+) is determined for each cell in a fixed field of view (or here, each cell in a tumor or cell cluster). The H-score may simply be based on a predominant staining intensity, or more complexly, can include the sum of individual H-scores for each intensity level seen. By one method, the percentage of cells at each staining intensity level is calculated, and finally, an H-score is assigned using the following formula: [1×(% cells 1+)+2×(% cells 2+)+ 3×(% cells 3+)]. The final score, ranging from 0 to about 300, provides more relative weight to higher-intensity membrane staining in a given tumor sample. The sample can then be considered positive or negative on the basis of a specific discriminatory threshold. Additional methods of calculating an H-score are described in United States Patent Publication 2015/0347702, the disclosure of which is hereby incorporated by reference herein in its entirety.

In some embodiments, the expression score is an Allred score. The Allred score is a scoring system which looks at the percentage of cells that test positive for hormone receptors, along with how well the receptors show up after staining (this is called "intensity"). This information is then combined to score the sample on a scale from 0 to 8. It is believed that the higher the score, the more receptors are found and the easier they are to see in the sample.

In other embodiments, the expression score is percent positivity. Again, in the context of scoring a breast cancer sample stained for the PR and Ki-67 biomarkers, for the PR and Ki-67 slides, the percent positivity is calculated (e.g., the total number of nuclei of cells (e.g., malignant cells) that are stained positive in each field of view in the digital image of a slide are summed and divided by the total number of positively and negatively stained nuclei from each of the fields of view of a digital image) in a single slide as follows: Percent positivity=number of positively stained cells/(number of positively stained cells+number of negatively stained cells).

In other embodiments, the expression score is an immunohistochemistry combination score, which is a prognostic score based on a number of IHC markers, wherein the number of markers is greater than one. Such combination scores are described in US Patent Publication No. 2017/0082627, the disclosure of which is hereby incorporated by reference herein in its entirety.

Tissue Region Identification Module

Following the identification of cells that meet a threshold protein biomarker expression level (step 311; see also step 411), tissue regions, e.g. tumor tissue regions, encompassing the identified cells are derived (step 312; see also step 412), such as by using the tissue region identification module 206. For example, after identifying individual cells having a minimum HER2 cell membrane staining intensity, tumor tissue regions encompassing the identified cells may be derived.

Tissue type identification is performed according to the methods described in PCT Publication No. WO2015/113895, filed Jan. 23, 2015 and entitled "Adaptive Classification for Whole Slide Tissue Segmentation," the disclosure of which is hereby incorporated herein by reference in its entirety. In general, PCT Publication No. WO2015/113895 describes segmenting tumor regions from other regions in an image via operations related to classification of the regions that include identifying grid points in the tissue image, classifying the grid points as one of a plurality of tissue types, and generating classified grid points based on a database of known characteristics of tissue types, assigning the classified grid points at least one of a high confidence score and a low confidence score, modifying a database of known characteristics of tis sue types based on the grid points that were assigned a high confidence score, and generating a modified database, and reclassifying the grid points that were assigned a low confidence score based on the modified database, to segment the tissue (e.g., identify tissue regions in an image).

Alternatively, or in addition, image analysis operations may be used to automatically detect tumor regions or other regions using automated image-analysis operations such as segmenting, thresholding, edge detection, etc., and FOVs automatically generated based on the detected regions.

In some embodiments, a tissue region mask may be derived. Methods of generating such tissue region masks are described in United States Patent Application Publication No. 2017/0154420, the disclosure of which is hereby incorporated by reference herein in its entirety.

Automated Image Registration Module

After the tissue regions are identified in a first image, e.g. an image having signals corresponding to one or more protein biomarkers (step 312; see also step 412), the identified tissue regions are mapped to a second image, e.g. an image having signals corresponding to one or more nucleic acid biomarkers (step 313; see also step 413). The mapping of identified tissue regions is particularly useful where serial tissue sections have been utilized, e.g. a first serial section stained for the presence of one or more protein biomarkers and a second serial section stained for the presence of one or more nucleic acid biomarkers. In this way, the mapping process enables identification of corresponding structures, cells and tissues in each serial section, despite differences between the serial tissue sections.

In general, registration comprises selecting one input image, or a portion thereof (e.g. a cell cluster), to serve as a reference image, and computing a transformation of each other input image to the coordinate frame of the reference image. Accordingly, all the input images may be aligned to the same coordinate system (e.g. the reference coordinate can be the slide section in the middle of the tissue block in the case of serial tissue sections or the slide with a specific marker) using image registration. Each image may therefore be aligned from its old coordinate system to the new reference coordinate system.

Registration is the process of transforming different sets of data, here images, or cell cluster within images, into one coordinate system. More specifically, registration is the process of aligning two or more images and, in general, involves designating one image as the reference (also called the reference image or the fixed image), and applying geometric transformations to the other images so that they align with the reference. A geometric transformation maps locations in one image to new locations in another image. The step of determining the correct geometric transformation parameters is key to the image registration process. The methods for computing a transformation of each image to a reference image are well known to those skilled in the art. For example, an image registration algorithm is described, for example, in "11th International Symposium on Biomedical Imaging (ISBI), 2014 IEEE, Apr. 29, 2014-May 2, 2014), the disclosure of which is hereby incorporated by reference herein in its entirety. A detailed method of image registration is outlined below Any registration method may utilized in the systems and methods disclosed herein. In some embodiments, the image registration is performed using the methods described in WO/2015/049233, entitled "Line-Based Image Registration and Cross-Image Annotation Devices, Systems and Methods," filed on Sep. 30, 2014, the disclosure of which is hereby incorporated by reference herein in its entirety.

WO/2015/049233 describes a registration process comprising a coarse registration process used alone or in combination with a fine registration process. In some embodiments, the coarse registration process may involve selecting digital images for alignment, generating a foreground image mask from each of the selected digital images, and matching tissue structure between the resultant foreground images. In other embodiments, generating a foreground image mask involves generating a soft-weighted foreground image from the whole slide image of a stained tissue section and applying OTSU thresholding to the soft-weighted foreground image to produce a binary soft-weighted image mask. In further embodiments, generating a foreground image mask involves generating a binary soft-weighted image mask from a whole slide image of a stained tissue section, separately generating a gradient magnitude image mask from the same whole slide image, applying OTSU thresholding to the gradient image mask to produce a binary gradient magnitude image mask, and combining the binary soft-weighted image and the binary gradient magnitude image mask using a binary OR operation to generate the foreground image mask. A "gradient," as that term is used herein, means the intensity gradient of pixels calculated for a particular pixel by taking into consideration an intensity value gradient of a set of pixels surrounding said particular pixel. Each gradient may have a particular "orientation" relative to a coordinate system whose x- and y-axis are defined by two orthogonal edges of the digital image. A "gradient orientation feature" may be a data value that indicates the orientation of the gradient within said coordinate system. In some embodiments, matching tissue structure involves computing line-based features from the boundary of each of the resultant foreground image masks, computing global transformation parameters between a first set of line-features on a first foreground image mask and a second set of line-features on a second foreground image mask, and globally aligning the first and second image based on the transformation parameters. In yet further embodiments, the coarse registration process includes mapping the selected digital images based on the global transformation parameters to a common grid, which grid may encompass the selected digital images. In some embodiments, the fine registration process may involve identifying a first sub-region of a first digital image in the set of aligned digital images; identifying a second sub-region on a second digital image in the set of aligned digital images, wherein the second sub-region is larger than the first sub-region and the first sub-region is located substantially within the second sub-region on common grid; and, computing an optimized location for the first sub-region in the second sub-region.

Figure 6:
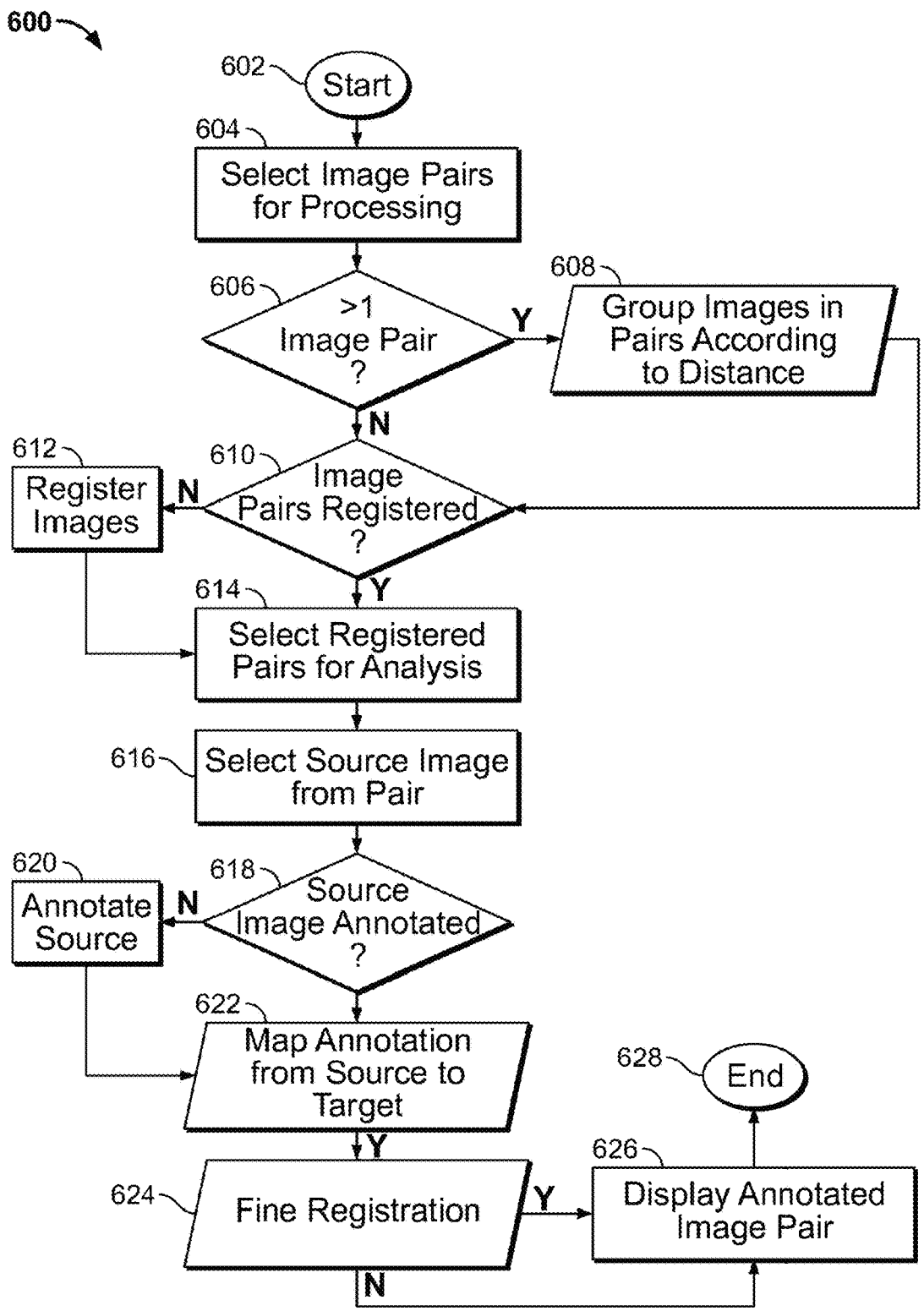
FIG. 6 sets forth a flow chart illustrating the steps of registering one or more images to a common coordinate system in accordance with some embodiments of the present disclosure.

These methods are illustrated in FIG. 6 herein, where the method 600 begins at the start block 602. At block 604, a set of image data or digital images is acquired (e.g. scanned or selected from the database) for manipulation. Each set of image data includes image data corresponding to, for example, a tissue section from a set of adjacent tissue sections of a single patient. At block 606, if only a single image pair is selected, the process proceeds directly to block 610. If more than a single pair of images is selected, then the set of selected images is grouped into pairs at block 608 prior to proceeding to block 610. In some embodiments, image pairs are selected as adjacent pairs. Thus, for example, if the set of selected images includes 10 parallel, adjacent slices (LI. . . . LI 0), then LI and L2 are grouped as a pair, L3 and L4 are grouped as a pair, etc. On the other hand, if information is not available as to which pairs of images are most similar to each other then, in some embodiments, images are grouped according to their distance apart, (e.g., inter-edge or inter-image distance corresponding to the chamfer distance between the edge-maps of the various images), pairing together images which are closest to one another. In exemplary embodiments of the present disclosure, an inter-edge/inter-image distance is utilized to pair of images. In some embodiments, edge-based Chamfer distance may be used to compute the inter-image/inter-edge distance. If the pairs of images have previously undergone a coarse registration process, such that the images have been coarsely aligned and the results have been saved, the process advances to block 614. Otherwise, at block 612 a coarse registration process is performed on the selected image pairs. The coarse registration process is described in further detail below.

Passing to block 614, the selected, and now registered (aligned), images are displayed on a common grid, with the images overlaid in a single image, displayed as separate images, or both, on a single monitor or spread across several monitors. At block 616, the client user may select one of the images from a pair of images as the source image. If the source image has already been annotated as desired, the process proceeds to block 622. Otherwise, the client user annotates the source image as desired at block 620. At block 622, which may (or may not) occur substantially simultaneously with block 620, the annotation is mapped to the other image in the pair (the target image) and graphically reproduced on the target image. In embodiments wherein annotation occurs prior to coarse registration, the annotation may be mapped from the source image to the target image at substantially the same time as the pair of images is registered (aligned). At block 624, the user may choose to whether or not to engage in a fine registration process. If the user chooses to directly display the results without performing fine registration, the process proceeds to block 626.

Otherwise, at block 624 a fine registration process is performed on the selected image pairs, for example to optimize the location of the mapped annotations and/or alignment of the images. The fine registration process is discussed in further detail below. At block 626, the annotated image pair is displayed with the results of the fine registration process (or the annotated image pair may be displayed only with the results of the coarse registration process if fine registration is not used). The method then ends at the final block 628.

Automated Nucleic Acid Biomarker Detection

Following the mapping of the identified tissue regions from a first image to a second image (step 313; see also step 413), signals (or dots) corresponding to one or more nucleic acid biomarkers may then be identified (step 314; see also step 414) in the mapped tissue regions in the second image using the dot detection module 208 and the dot classification module 209. Subsequently, a dot counting and sorting module 210 may be used to interpret the identified signals such that gene aberrations in nuclei may be identified for assessment (step 315; see also step 415).

In some embodiments, modules 208, 209, and 210 are used to detect signals corresponding to at least one nucleic acid biomarker in each mapped tissue region in the second image. Based on the detection of the signals corresponding to the at least one nucleic acid biomarker, an assessment may be made as to whether cells or nuclei within the mapped tissue regions have genetic aberrations (e.g. abnormally high copy numbers; chromosomal abnormalities). In some embodiments, the nuclei are assessed for genetic aberrations by determining whether a total number of identified dots corresponding to one or more signals from the at least one nucleic acid biomarker in each nucleus meet a predetermined threshold value. For example, where a biological sample is stained with a single nucleic acid probe, dots corresponding to signals from the single nucleic acid probe may be detected, classified, and then counted. The copy number present in each nucleus, may then be compared against a predetermined threshold value.

In other embodiments, the nuclei are assessed for genetic aberrations by calculating a ratio of first identified dots corresponding to a first nucleic acid biomarker to second identified dots corresponding to a second nucleic acid biomarker and comparing the calculated ratio for each nucleus to a predetermined threshold value. In some embodiments, dots are identified for each nucleus, e.g. dots are identified corresponding to each different signal type in each nucleus. For example, where a biological sample is stained with two nucleic acid probes, dots corresponding to signals from each probe (e.g. black dots or red dots in the context of staining for HER2 and Chromosome 17) may be detected and classified, and a ratio may be calculated based on the total number of dots corresponding to each probe, the ratio ultimately being utilized to determine if a genetic aberration exists within a cell nucleus (see FIGS. 10 and 11).

By way of another example, a biological sample may be stained using an EGFR/CEP 7 dual probe, and a ratio of EGFR gene to chromosome 7 may be calculated and compared against a clinically relevant threshold value. By making the comparisons, the following may be observed: disomy (score=1), low trisomy (score=2), high trisomy (score=3), low polysomy (score=4), high polysomy (score=5) and amplification (score=6) (see Dahle-Smith, "Epidermal Growth Factor (EGFR) copy number aberrations in esophageal and gastro-esophageal junction carcinoma," Mol Cytogenet, 2015; 8:78, the disclosure of which is hereby incorporated by reference herein in its entirety.

Figure 10:
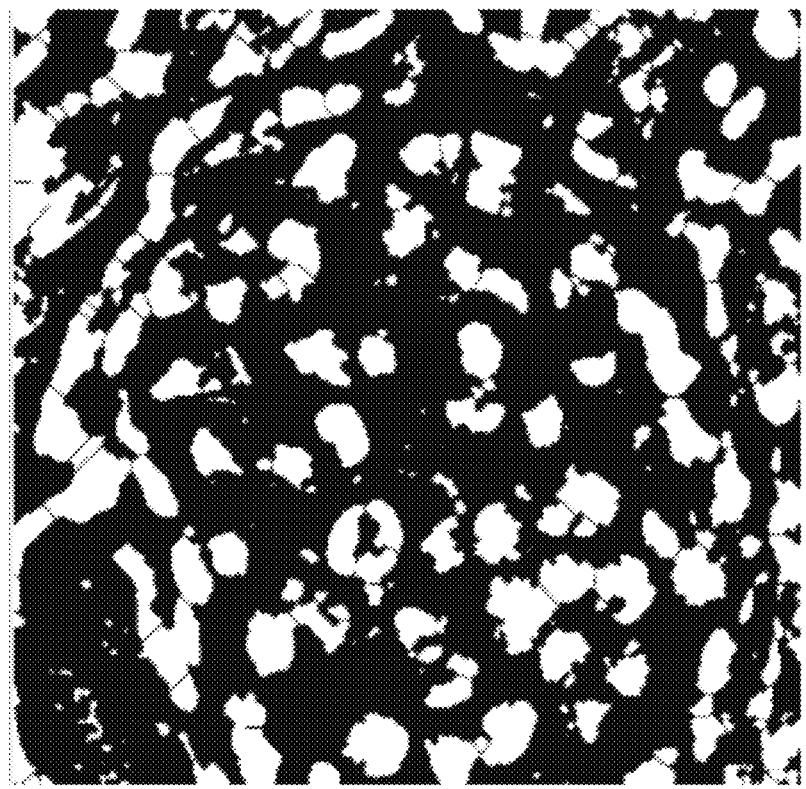
FIG. 10 illustrates a close-up view of a sample stained for the presence of a HER2 nucleic acid biomarker and a Chromosome 17 nucleic acid biomarker (bottom), and the generation of a foreground segmentation mask after cell detection and classification (top).
Figure 10:
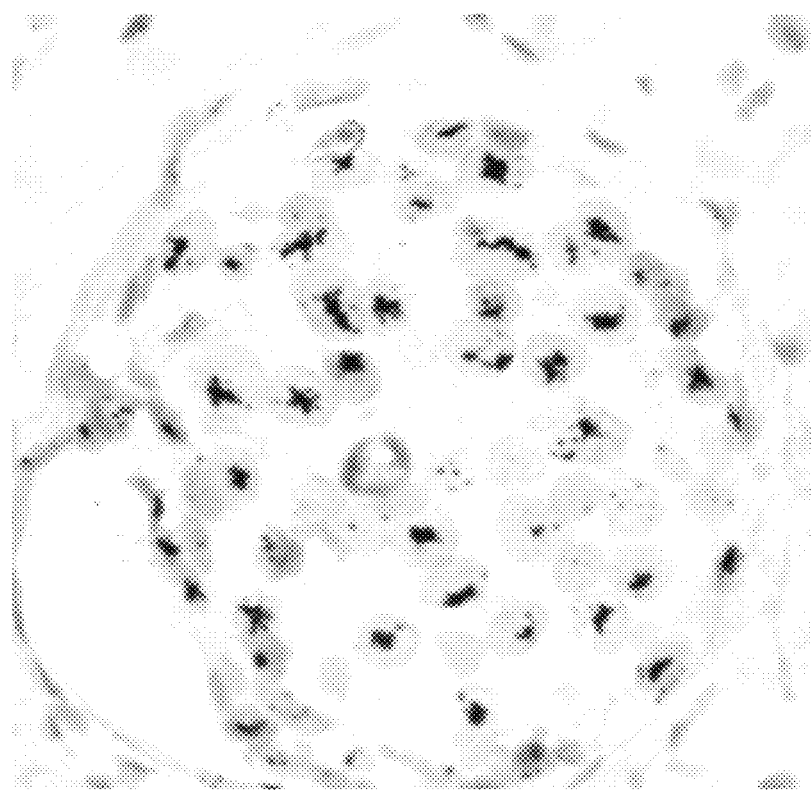

Further non-limiting examples of dot detection, dot classification, and dot counting in the context of staining for the presence of HER2 and Chromosome 17 are described herein and illustrated in FIG. 10. Again, the systems and methods described herein are not limited to determining genetic aberrations using a dual ISH assay directed to HER2, but rather such examples are for illustrative purposes only.

Dot Detection Module

Figure 11:
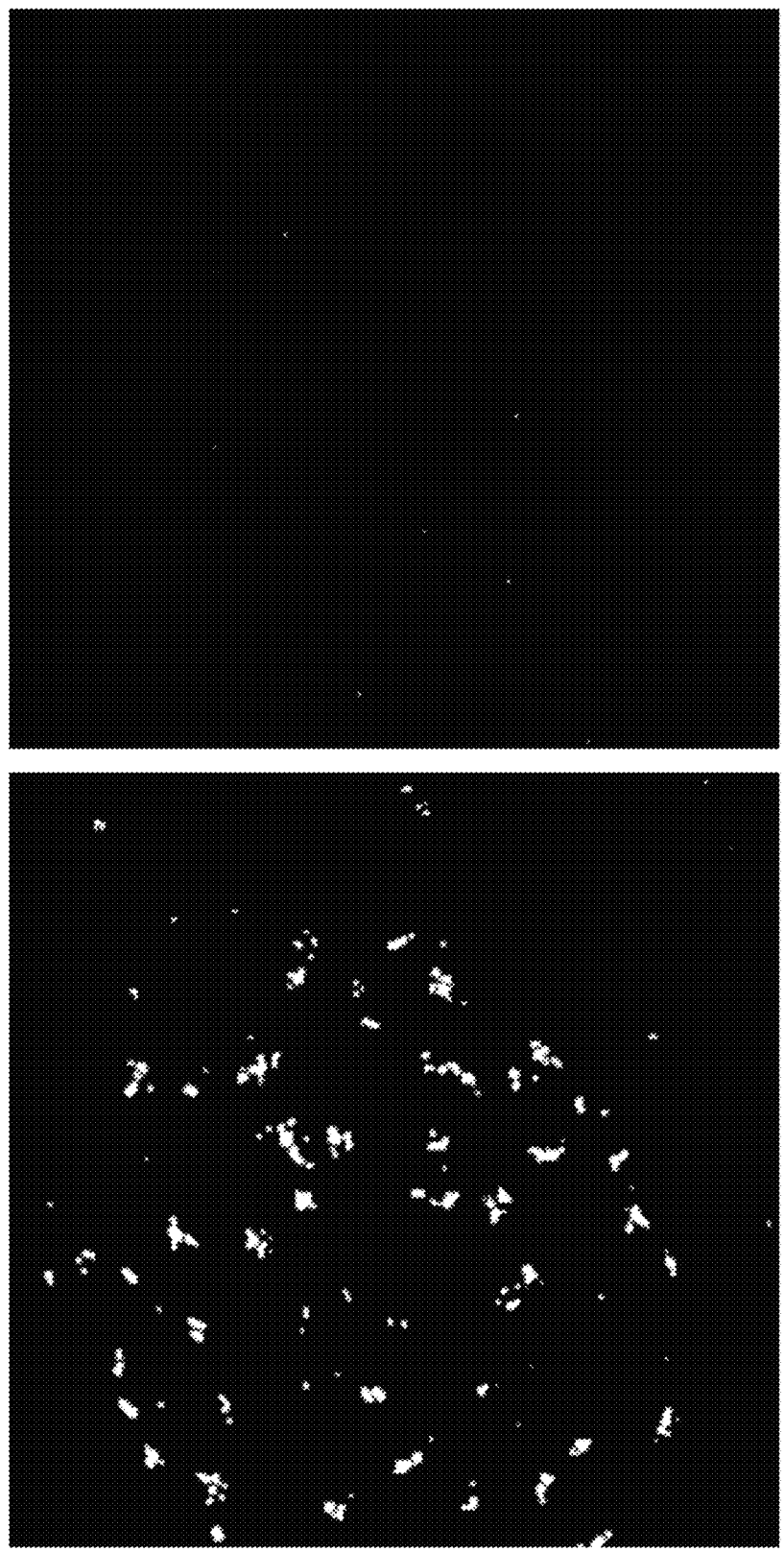
FIG. 11 illustrates the result of dot detection for a HER2 DUAL ISH Assay (top—detected red dots; bottom—detected black dots).

In general, dot detection is performed with a dot detection module 208 to identify all the dot pixels in an input image (see, e.g., FIG. 11). The detected dots are then provided to a dot classification module 209 for further processing and analysis.

In some embodiments, dot detection may be performed using one or more of various derived image features which include, but are not limited to, absorbance, multi-scale difference of Gaussian (DoG), and features from unmixed image channels obtained obtain after color deconvolution. Dot detection according to the presently disclosed methods facilitate accurate and robust dot detection by considering a plurality of features, such as those recited above. In some embodiments, methods are employed which enable the specific detection of signals corresponding to black dots and/or red dots, such as utilized in the HER2 DUAL ISH assay. The skilled artisan will also appreciate that while certain examples herein may refer biomarkers labeled with chromogens (e.g. the black and red dots for the HER2 DUAL ISH assay), dot detection may take place with biomarkers labeled with fluorophores (e.g. FISH).

In some embodiments, dot detection is accomplished using the methods described in United States Patent Publication No. 2014/0377753, the disclosure of which is hereby incorporated by reference herein in its entirety. For example, dots may be first identified by converting the color image of a cell to a monochromatic image. In one embodiment, the monochromatic image is created by first transforming the color space of the color image of the cell from an RGB color space to an L*a*b color space. In the L*a*b color space, the "L" channel represents the brightness of a pixel, the "a" channel reflects the red and green components of a pixel, and the "b" channel represents the blue and yellow components of a pixel. A new image is then created that emphasizes the red and black colors in the image which is obtained by linearly combining the "L," "a" and "b" values at each pixel location. In some embodiments, dots are detected in the red and black-enhanced image by running the enhanced image though a number of filters.

In some embodiments, the filters are Difference of Gaussian ("DoG") filters where each filter size is selected based on the expected size of the dots/clumps of dots to be detected. In general, difference of Gaussians is a feature enhancement algorithm that involves the subtraction of one blurred version of an original image from another, less blurred version of the original. In the simple case of grayscale images, the blurred images are obtained by convolving the original grayscale images with Gaussian kernels having differing standard deviations. It is believed that blurring an image using a Gaussian kernel suppresses only high-frequency spatial information. Subtracting one image from the other preserves spatial information that lies between the range of frequencies that are preserved in the two blurred images. Thus, the difference of Gaussians is a band-pass filter that discards all but a handful of spatial frequencies that are present in the original grayscale image. In some embodiments, the size of the DoG filters ranges from about 0.05 microns to about 5 microns. In some embodiments, the results from each pass though the DoG filters are combined to create a filtered gray scale image that is used as a mask to represent the stained nuclear material and some "junk" within each cell. Methods of generating such masks are described in United States Patent Publication No. 2017/0337695, the disclosure of which is hereby incorporated by reference herein in its entirety. The combined gray scale image may then be binarized using, for example, an adaptive thresholding technique based on the Otsu method to produce a dot mask image where everything outside the dot has one binary value (e.g., a logic 0) and everything inside a dot has an opposite binary value (e.g., a logic 1).

In other embodiments, the detection of first and second dots representing in-situ hybridization signals of different colors comprises generating a first color channel image and a second color channel image via color deconvolution (e.g. using the unmixing module 203) of the digital image, the first color channel image corresponding to the color spectrum contribution of the first stain and the second color channel image corresponding to the color spectrum contribution of the second stain; computing at least one DoG image from the digital image by applying a pair of Gaussian filters whose Kernels have a different standard deviation to the digital image and by subtracting the two filtered images output by the Gaussian filters from each other, the DoG image being a difference-of-Gaussian image; computing an absorbance image from the image of the tissue sample; detecting sets of adjacent pixels in the digital image whose absorbance values in the absorbance image exceed an absorbance threshold and whose DoG values in the DoG image exceeds an DoG threshold and using the detected sets of adjacent pixels as prospective dots; identifying the ones of the prospective dots whose intensity values in the first color channel image exceeds a first-color-intensity threshold and outputting said identified prospective dots as the detected first dots; and identifying the ones of the prospective dots whose intensity values in the second color channel image exceeds a second-color-intensity threshold and outputting said identified prospective dots as the detected second dots.

In other embodiments, and in the context of staining a sample with the HER2 DUAL ISH assay, dot detection is accomplished using the methods described in United States Patent Publication No. 2017/0323148, the disclosure of which is hereby incorporated by reference herein in its entirety. According to the methods described within the '148 Publication, dot detection is accomplished by computing pixels based on absorbance image features, difference of Gaussian (DoG) image features, and unmixed color image channel features, where the pixels are computed by evaluating whether certain features within the images meet predefined threshold criteria. In some embodiments, the threshold criteria have been empirically derived after extensive experimentation. In this context, pixels are computed based on features that meet predetermined threshold criteria, e.g. dot pixels that are high enough in both difference of Gaussian (DoG) and absorbance; black dot pixels that are high enough in a black unmixed image strength and DoG; and red dot pixels that are high enough in red unmixed image strength and DoG. In some embodiments, multiple subsets of pixels are computed, each meeting different threshold criteria such that a final subset of pixels are strong in all threshold criteria. After the final subset of pixels is computed, a "fill holes" operation is performed, as known to those of skill in the art.

The skilled artisan will appreciate that different criteria may be established for different ISH probes, assays, and protocols to accommodate different signals (e.g. of different colors) in the images and to optimize dot detection for that specific ISH protocol, accordingly.

Dot Classification Module

Following dot detection with the dot detection module 208, a dot classification module 209 is run by the system 200 such that all of the dots pixels are assigned a color value (e.g. in the context of the HER2 DUAL ISH ASSAY, black or red color values).

In some embodiments, dot classification is accomplished using the methods described in United States Patent Publication No. 2014/0377753, the disclosure of which is hereby incorporated by reference herein in its entirety. According to the methods of the '753 Publication, once the dot mask image has been created (described above), it is used along with a classifier (such as the classifier in the cell detection and classification module 204) to remove any dots associated with "junk" and to leave the dots that represent signals corresponding to the stains of interest (e.g. black and red signals in the case of the HER2 DUAL ISH assay). The '753 Publication describe that, in some embodiments, a linear binary classifier may be utilized. In the first stage using the classifier, the computer system executes instructions to prune out dots with weak DoG responses based on a histogram of responses determined for each of the cells analyzed. In a second stage, the bold red dots are separated from the faint red dots and the black dots are separated from the dark blue dots by analyzing the color of the RGB image of the tissue at pixel locations that correspond to the area within each of the dots in the dot mask image. The result is a set of only red and black dots. The remainder of the dots are considered "junk" and are removed. Dots and dot blobs are then extracted using a connected component analysis. To determine if a dot represents a signal of interest (e.g. a HER2 gene or a chromosome 17), multiple metrics of the dots (including dot blobs) are measured and analyzed. These metrics include dot size, color, orientation, shape, response of the multiple difference of Gaussian filters, relation or distance between adjacent dots, and a number of other factors that can be measured by the computer. The metrics are then inputted into the classifier. In some embodiments, the classifier has previously been trained on a training set of data that have been positively identified as representing certain genes under study (e.g. either a HER2 gene or a chromosome 17), such as by a trained pathologist. In some embodiments, the classifier has been trained on a set of training slides that contain a range of dot variability and the linear margin binary classifier model has been taught for each stage. The resulting model, parameterized by a discriminant hyperplane, divides the feature space into two labeled regions that define either a first or second gene, e.g. HER2 gene or a chromosome 17. Once the classifier has been trained, the metrics measured for the unknown dots in the image are applied to the classifier. The classifier can then indicate what type of dot (e.g., HER2 gene or chromosome 17) is represented.

In other embodiments, and in the context of staining a sample with the HER2 DUAL ISH assay, dot detection is accomplished using the methods described in United States Patent Publication No. 2017/0323148, the disclosure of which is hereby incorporated by reference herein in its entirety. According to the methods of the '148 Publication, because multiple distinct spectral signals may co-exist in a single pixel in ISH, a color deconvolution algorithm is run on an image, where each pixel is unmixed (e.g. using unmixing module 203) into the three component channels (e.g. red, black, and dark blue channels), using pixels in the optical density domain Following color deconvolution and training of the classification module/classifier, the dot pixels are classified by the computer device or system and as known to those of skill in the art. In some embodiments, the classification module is a Support Vector Machine ("SVM") (such as described herein with regard to the cell detection and classification module 204). In the context of dual ISH for HER2, the detected dots are classified as red, black, and/or blue dots. As an example, when the contribution of the black channel after color deconvolution is pre-dominantly high compared to the other two channels of red and blue, then that dot pixel is more likely to be classified as black; when the contribution of the red channel after color deconvolution is pre-dominantly high as compared to the other two channels of blue and black, then that dot pixel is more likely to be classified as red.

In some embodiments and following dot detection and classification, a refinement process may also be run which comprises a series of operations used to enhance and clarify the initial dot detection and/or classification. These steps are described within United States Patent Publication No. 2017/0323148, the disclosure of which is hereby incorporated by reference herein in its entirety. Those of skill in the art will recognize that some or all of these additional steps or processes may be applied to further enhance the dot detection and classification results provided above. While the steps in the '148 Publication are disclosed with regard to dual ISH for HER2 detection, the skilled artisan will be able to adapt and modify the steps to accommodate any ISH probe or assays utilized. The skilled artisan will also appreciate that not all of the operations described '148 Publication need to be performed to refine classification, and the skilled artisan will be able to pick and choose appropriate operations based on the outputs of the detection and classification modules and the images provided to the system.

Dot Counting and Sorting Module

Following dot detection, classification, and optional refinement, the dots are counted. In some embodiments, data may be compiled based on the number of dots counted. For example, the dots may be sorted based on count number and/or a ratio of the number of first dots (e.g. black dots) to the number of second dots (e.g. red dots) may be computed and the ratio may be used for sorting or for genetic certain plots.

In some embodiments, dot counting may be accomplished using the methods described in United States Patent Publication No. 2017/0323148, the disclosure of which is hereby incorporated by reference herein in its entirety. For example, connected components labeling process may be applied on all first dot pixels (e.g. red dot pixels) to identify the first dot blobs ("red dot blobs"). Similarly, a connected components labeling is applied on the second dot pixels (e.g. "black dot pixels") to obtain second dot blobs (e.g. "black dot blobs"). In general, connected components labeling scans an image and groups its pixels into components based on pixel connectivity, i.e. all pixels in a connected component share similar pixel intensity values and are in some way connected with each other.

In the context of dual ISH for HER2 detection, it is understood by those of skill in the art that black dots are generally smaller than red dots and any counting rules must take this into consideration. For example, if system 200 determines that the size of the dot is on the scale of a nominal single dot size, then the dot is counted as either a HER2 dot or a chromosome 17 dot, as labeled by the classifier. If the dot is larger than the nominal single dot size, then the system 200 determines the area of the cluster and divides it by the area of a nominal dot to determine how many dots are likely included in the dot cluster. The closeness of the dots classified as HER2 and chromosome 17 is used in the counting algorithm. The counting rules, of course, may be modified by those of skill in the art according to the specific ISH probes, assays, and protocols used.

In some embodiments, an average black dot blob size (in pixels) is used to allocate a certain number of seeds to a black dot blob cluster. For a smaller black dot blob, it should have either, or both (i) vote strength (using DoG and radial symmetry on absorbance) greater than a certain threshold (e.g. empirically determined and set to 5); and/or (ii) absorbance greater than a certain absorbance threshold (e.g. empirically determined and set to 0.33). In some embodiments, for a smaller red dot blob, it should have either, or both (i) vote strength (using DoG and radial symmetry on A channel) greater than a certain threshold (e.g. empirically determined and set to 15); and/or (ii) an A channel value (from the LAB color space) (higher A is an indicator of redness) greater than a certain threshold (e.g. empirically determined and set to 133 where the A channel can take values from 0-255), and the absorbance should be greater than a certain threshold (e.g. empirically determined and set to 0.24). For example, a red dot with a diameter of less than 7 pixels may be considered as small red dot. Red dots with a diameter equal to or larger than 7 pixels may be considered as large red dots. The black dots may be larger on average, so a small black dot may have a diameter of less than 10 pixels and a large black dot may be a black dot with a diameter equal to or larger than 10 pixels.

Once the first and second dot blobs (e.g. black and red dot blobs) are identified, counts are returned for the first and second dot blobs (e.g. black and red dot blobs). In some embodiments, a ratio of the first to second dots is counted for each nucleus.

In some embodiments, and based on the ratio, the expression level can be determined to be an over-expression, under-expression, etc. (step 315; see also step 415). In some embodiments, the score is compared to a clinically relevant threshold value. For example, and in the context of staining for HER2 and Chromosome 17, the clinically relevant threshold may be the integer 2.

In some embodiments, the ratios from all nuclei may be sorted or ranked. In some embodiments, the ratios may be stored in a database or storage module 240 alone or in combination with cell/nucleus location information (e.g. x,y coordinates of the cell/nucleus).

Visualization Module

A visualization module may be utilized such that data generated from the signal collection (step 314; see also step 414) and assessment (step 315; see also step 415) may illustrated to facilitate quick and robust analysis. In some embodiments, an overlay may be generated based on the derived data and assessments made. For example, and in the context of HER2, calculated ratios exceeding a particular threshold (e.g. 2) may be assigned a first indicia (e.g. a first color), while those calculated ratios at or below the particular threshold (e.g. 2) may be assigned a second indicia (e.g. a second color). In some embodiments, where the first and second indicia are assigned colors, the colors may be traced along a perimeter of the cell. In other embodiments, where the first and second indicia are assigned colors, the cells may be filled with the color. The generated overlay may then be superimposed over a whole slide image or any portion thereof (e.g. to facilitate the conveyance of results to a reviewer). In some embodiments, the overlay may include the calculated ratio for each cell/nucleus, with or without other indicia (e.g. other colors).

In some embodiments, a heat map may be generated identifying areas having meeting certain threshold limitations. For example, a heat map may be generated illustrating regions having calculated ratios between 2.0 and 2.5 in a first color, regions having calculated ratios between 2.5 and 3.0 in a second color, and regions having calculated rations above 3.0 in a third color.

In other embodiments, histogram plots may be derived based on the data and may be visualized along with any generated overlay. In some embodiment, histogram plots illustrating the distribution of different calculated ratios may be generated.

In some embodiments, tables may be generated based on the data and may be visualized along with any generated overlay or histogram plot. In some embodiments, the table includes a listing of a predetermined number of nuclei (e.g. 20) and the calculated ratios for those predetermined number of nuclei. In some embodiments, the table may also include location information, e.g. the location of a cell/nucleus, or the mapped tissue region in which the cell/nucleus is located. In some embodiments, the table may also include the total dot count for each corresponding nucleic acid biomarker (e.g. a total dot count for black dots and a total dot count for red dots for each nucleus). In this way, the table may be used by a pathologist to review individual cells and, if necessary, manually override any automatically computed ratio or assessment.

Other Components for Practicing Embodiments of the Present Disclosure

The system 200 of the present disclosure may be tied to a specimen processing apparatus that can perform one or more preparation processes on the tissue specimen. The preparation process can include, without limitation, deparaffinizing a specimen, conditioning a specimen (e.g., cell conditioning), staining a specimen, performing antigen retrieval, performing immunohistochemistry staining (including labeling) or other reactions, and/or performing in situ hybridization (e.g., SISH, FISH, etc.) staining (including labeling) or other reactions, as well as other processes for preparing specimens for microscopy, microanalyses, mass spectrometric methods, or other analytical methods.

The processing apparatus can apply fixatives to the specimen. Fixatives can include cross-linking agents (such as aldehydes, e.g., formaldehyde, paraformaldehyde, and glutaraldehyde, as well as non-aldehyde cross-linking agents), oxidizing agents (e.g., metallic ions and complexes, such as osmium tetroxide and chromic acid), protein-denaturing agents (e.g., acetic acid, methanol, and ethanol), fixatives of unknown mechanism (e.g., mercuric chloride, acetone, and picric acid), combination reagents (e.g., Carnoy's fixative, methacarn, Bouin's fluid, B5 fixative, Rossman's fluid, and Gendre's fluid), microwaves, and miscellaneous fixatives (e.g., excluded volume fixation and vapor fixation).

If the specimen is a sample embedded in paraffin, the sample can be deparaffinized using appropriate deparaffinizing fluid(s). After the paraffin is removed, any number of substances can be successively applied to the specimen. The substances can be for pretreatment (e.g., to reverse protein-crosslinking, expose nucleic acids, etc.), denaturation, hybridization, washing (e.g., stringency wash), detection (e.g., link a visual or marker molecule to a probe), amplifying (e.g., amplifying proteins, genes, etc.), counterstaining, coverslipping, or the like.

The specimen processing apparatus can apply a wide range of substances to the specimen. The substances include, without limitation, stains, probes, reagents, rinses, and/or conditioners. The substances can be fluids (e.g., gases, liquids, or gas/liquid mixtures), or the like. The fluids can be solvents (e.g., polar solvents, non-polar solvents, etc.), solutions (e.g., aqueous solutions or other types of solutions), or the like. Reagents can include, without limitation, stains, wetting agents, antibodies (e.g., monoclonal antibodies, polyclonal antibodies, etc.), antigen recovering fluids (e.g., aqueous- or non-aqueous-based antigen retrieval solutions, antigen recovering buffers, etc.), or the like. Probes can be an isolated nucleic acid or an isolated synthetic oligonucleotide, attached to a detectable label or reporter molecule. Labels can include radioactive isotopes, enzyme substrates, co-factors, ligands, chemiluminescent or fluorescent agents, haptens, and enzymes.

The specimen processing apparatus can be an automated apparatus, such as the BENCHMARK XT instrument and SYMPHONY instrument sold by Ventana Medical Systems, Inc. Ventana Medical Systems, Inc. is the assignee of a number of United States patents disclosing systems and methods for performing automated analyses, including U.S. Pat. Nos. 5,650,327, 5,654,200, 6,296,809, 6,352,861, 6,827,901 and 6,943,029, and U.S. Published patents application Ser. Nos. 20030211630 and 20040052685, each of which is incorporated herein by reference in its entirety. Alternatively, specimens can be manually processed.

After the specimens are processed, a user can transport specimen-bearing slides to the imaging apparatus. In some embodiments, the imaging apparatus is a brightfield imager slide scanner. One brightfield imager is the iScan HT and DP200 (Griffin) brightfield scanner sold by Ventana Medical Systems, Inc. In automated embodiments, the imaging apparatus is a digital pathology device as disclosed in International Patent Application No.: PCT/US2010/002772 (Patent Publication No.: WO/2011/049608) entitled IMAGING SYSTEM AND TECHNIQUES or disclosed in U.S. Patent Publication No. 2014/0178169 filed on Sep. 9, 2011, entitled IMAGING SYSTEMS, CASSETTES, AND METHODS OF USING THE SAME.

The imaging system or apparatus may be a multispectral imaging (MSI) system or a fluorescent microscopy system. The imaging system used here is an MSI. MSI, generally, equips the analysis of pathology specimens with computerized microscope-based imaging systems by providing access to spectral distribution of an image at a pixel level. While there exists a variety of multispectral imaging systems, an operational aspect that is common to all of these systems is a capability to form a multispectral image. A multispectral image is one that captures image data at specific wavelengths or at specific spectral bandwidths across the electromagnetic spectrum. These wavelengths may be singled out by optical filters or by the use of other instruments capable of selecting a pre-determined spectral component including electromagnetic radiation at wavelengths beyond the range of visible light range, such as, for example, infrared (IR).

An MSI system may include an optical imaging system, a portion of which contains a spectrally-selective system that is tunable to define a pre-determined number N of discrete optical bands. The optical system may be adapted to image a tissue sample, illuminated in transmission with a broadband light source onto an optical detector. The optical imaging system, which in one embodiment may include a magnifying system such as, for example, a microscope, has a single optical axis generally spatially aligned with a single optical output of the optical system. The system forms a sequence of images of the tissue as the spectrally selective system is being adjusted or tuned (for example with a computer processor) such as to assure that images are acquired in different discrete spectral bands. The apparatus may additionally contain a display in which appears at least one visually perceivable image of the tissue from the sequence of acquired images. The spectrally-selective system may include an optically-dispersive element such as a diffractive grating, a collection of optical filters such as thin-film interference filters or any other system adapted to select, in response to either a user input or a command of the pre-programmed processor, a particular pass-band from the spectrum of light transmitted from the light source through the sample towards the detector.

An alternative implementation, a spectrally selective system defines several optical outputs corresponding to N discrete spectral bands. This type of system intakes the transmitted light output from the optical system and spatially redirects at least a portion of this light output along N spatially different optical paths in such a way as to image the sample in an identified spectral band onto a detector system along an optical path corresponding to this identified spectral band.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Any of the modules described herein may include logic that is executed by the processor(s). "Logic," as used herein, refers to any information having the form of instruction signals and/or data that may be applied to affect the operation of a processor. Software is an example of logic.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). For example, the network 20 of FIG. 1 can include one or more local area networks.

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Example

| Image | DISH-median-ratio | Number of relevant DISH cells | HER2 score (HER2 slide) | Number of relevant DISH cells |
|---|---|---|---|---|
| 1 | 1.546 | 7676 | 2 | 17557 |
| 2 | 3.2939 | 1199 | 3 | 6874 |
| 3 | 2.9866 | 2790 | 3 | 16232 |
| 4 | 5.8539 | 1861 | 3 | 9163 |
| 5 | 6.443 | 336 | 3 | 4607 |
| 6 | 4.6439 | 578 | 3 | 932 |
| 7 | 1.3034 | 351 | 1 | 4440 |
| 8 | 2.878 | 164 | 1 | 6124 |
| 9 | 1.6942 | 1478 | 1 | 6124 |
| 10 | 7.2317 | 41 | 1 | 628 |

The table above sets forth examples of results returned after image analysis for detecting the HER2 protein biomarker and the HER2 and Chromosome 17 nucleic acid biomarkers. The table further illustrates the calculated ratios of HER2 to Chromosome 17 as well as the number of relevant cells detected.

Additional Embodiments

A system for assessing genetic aberrations in images of biological samples stained for the presence of at least one nucleic acid biomarker, the system comprising: (i) one or more processors, and (ii) one or more memories coupled to the one or more processors, the one or more memories to store computer-executable instructions that, when executed by the one or more processors, cause the system to perform operations comprising: running a detection algorithm to automatically detect and identify cells in a first image stained for the presence of at least one protein biomarker that meet predetermined protein biomarker staining criteria; deriving tumor tissue regions (e.g. automatically) in the first image encompassing those identified cells meeting the predetermined protein biomarker staining criteria; performing an automatic registration of the first image and a second image to a common coordinate system such that the derived tumor tissue regions in the first image are mapped to the second image to provide mapped tumor tissue regions, wherein the second image includes signals corresponding to the presence of the at least one nucleic acid biomarker; automatically identifying dots within the mapped tumor tissue regions corresponding to the signals from the at least one nucleic acid biomarker; and assessing (e.g. Automatically assessing) whether tumor nuclei in the mapped tumor tissue regions in the second image have genetic aberrations based on the identified dots.

A method of assessing genetic aberrations in images of biological samples stained for the presence of at least one nucleic acid biomarker comprising: automatically detecting cells in a first image stained for the presence of at least one protein biomarker that meet predetermined protein biomarker staining criteria; deriving tumor tissue regions in the first image encompassing those identified cells meeting the predetermined protein biomarker staining criteria; automatically registering the first image and a second image to a common coordinate system such that the derived tumor tissue regions in the first image are mapped to the second image to provide mapped tissue regions, wherein the second image includes signals corresponding to the presence of the at least one nucleic acid biomarker; automatically identifying dots within the mapped tissue regions corresponding to signals from the at least one nucleic acid biomarker; and assessing (e.g. automatically) whether tumor nuclei in the mapped tissue regions in the second image have genetic aberrations based on the identified dots corresponding to the at least one nucleic acid biomarker.

A non-transitory computer-readable medium storing instructions for assessing genetic aberrations in a biological sample stained for the presence of at least one nucleic acid biomarker comprising: running a detection algorithm to automatically detect and identify cells in a first image stained for the presence of at least one protein biomarker that meet predetermined protein biomarker staining criteria; deriving tumor tissue regions in the first image encompassing those identified cells meeting the predetermined protein biomarker staining criteria; performing an automatic registration of the first image and a second image to a common coordinate system such that the derived tumor tissue regions in the first image are mapped to the second image to provide mapped tissue regions, wherein the second image includes signals corresponding to the presence of the at least one nucleic acid biomarker; automatically detecting dots within the mapped tissue regions corresponding to signals from the at least one nucleic acid biomarker; counting all detected dots within each tumor nucleus in each mapped tissue region; and assessing (e.g. automatically) whether each tumor nucleus in each mapped region has a genetic aberration based on a total number of dots counted in each nucleus.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ concepts of the various patents, applications and publications to provide yet further embodiments.

Although the present disclosure has been described with reference to a number of illustrative embodiments, it should be understood that numerous other modifications and embodiments can be devised by those skilled in the art that will fall within the spirit and scope of the principles of this disclosure. More particularly, reasonable variations and modifications are possible in the component parts and/or arrangements of the subject combination arrangement within the scope of the foregoing disclosure, the drawings, and the appended claims without departing from the spirit of the disclosure. In addition to variations and modifications in the component parts and/or arrangements, alternative uses will also be apparent to those skilled in the art.

The invention claimed is:

1. A method comprising:
acquiring a first image depicting a portion of a biological sample stained for a presence of one or more first biomarkers and a second image depicting a portion of the biological sample stained for a presence of one or more second biomarkers;
identifying cells in the first image having staining intensity levels that satisfy predetermined expression levels;
identifying tissue regions in the first image encompassing the cells identified in the first image;
identifying mapped tissue regions in the second image by mapping the tissue regions identified in the first image to the second image;
detecting signals in the mapped tissue regions that correspond to at least one second biomarker of the one or more second biomarkers; and
assessing whether nuclei in the mapped tissue regions have genetic aberrations based on the signals, wherein a portion of the signals correspond to a first nucleic acid biomarker and a portion of the signals correspond to a second nucleic acid biomarker, and wherein assessing whether nuclei in the mapped tissue regions have genetic aberrations based on the signals comprises calculating a ratio of dots corresponding to the portion of the signals corresponding to the first nucleic acid biomarker to dots corresponding to the portion of the signals corresponding to the second nucleic acid biomarker.

2. The method of claim 1, wherein the first image corresponds to a first serial tissue section of the biological sample and the second image corresponds to a second serial tissue section of the biological sample, wherein the first serial tissue section is adjacent to the second serial tissue section.

3. The method of claim 1, wherein at least one first biomarker of the one or more first biomarkers is an HER2 protein biomarker and the at least one second biomarker is a Chromosome 17 nucleic acid biomarker.

4. The method of claim 1, wherein mapping the tissue regions identified in the first image to the second image results in the tissue regions identified in the first image being identified in the second image.

5. The method of claim 1, further comprising:
identifying dots in the mapped tissue regions corresponding to the signals in the mapped tissue regions; and
accessing whether the nuclei in the mapped tissue regions have genetic aberrations based on the dots.

6. The method of claim 1, wherein assessing whether nuclei in the mapped tissue regions have genetic aberrations based on the signals comprises determining whether a total number of dots corresponding to the signals meet a predetermined threshold value.

7. A system comprising:
(i) one or more processors; and
(ii) one or more memories coupled to the one or more processors, the one or more memories storing computer-executable instructions that, when executed by the one or more processors, cause the system to perform operations comprising:
acquiring a first image depicting a portion of a biological sample stained for a presence of one or more first biomarkers and a second image depicting a portion of the biological sample stained for a presence of one or more second biomarkers;
identifying cells in the first image having staining intensity levels that satisfy predetermined expression levels;
identifying tissue regions in the first image encompassing the cells identified in the first image;
identifying mapped tissue regions in the second image by mapping the tissue regions identified in the first image to the second image;
detecting signals in the mapped tissue regions that correspond to at least one second biomarker of the one or more second biomarkers; and
assessing whether nuclei in the mapped tissue regions have genetic aberrations based on the signals, wherein a portion of the signals correspond to a first nucleic acid biomarker and a portion of the signals correspond to a second nucleic acid biomarker, and wherein assessing whether nuclei in the mapped tissue regions have genetic aberrations based on the signals comprises calculating a ratio of dots corresponding to the portion of the signals corresponding to the first nucleic acid biomarker to dots corresponding to the portion of the signals corresponding to the second nucleic acid biomarker.

8. The system of claim 7, wherein the first image corresponds to a first serial tissue section of the biological sample and the second image corresponds to a second serial tissue section of the biological sample, wherein the first serial tissue section is adjacent to the second serial tissue section.

9. The system of claim 7, wherein at least one first biomarker of the one or more first biomarkers is an HER2 protein biomarker and the at least one second biomarker is a Chromosome 17 nucleic acid biomarker.

10. The system of claim 7, wherein mapping the tissue regions identified in the first image to the second image results in the tissue regions identified in the first image being identified in the second image.

11. The system of claim 7, further comprising:
identifying dots in the mapped tissue regions corresponding to the signals in the mapped tissue regions; and
accessing whether the nuclei in the mapped tissue regions have genetic aberrations based on the dots.

12. The system of claim 7, wherein assessing whether nuclei in the mapped tissue regions have genetic aberrations based on the signals comprises determining whether a total number of dots corresponding to the signals meet a predetermined threshold value.

13. One or more non-transitory computer-readable media storing computer-executable instructions that, when executed by one or more processors, cause a system to perform operations comprising:
acquiring a first image depicting a portion of a biological sample stained for a presence of one or more first biomarkers and a second image depicting a portion of the biological sample stained for a presence of one or more second biomarkers;
identifying cells in the first image having staining intensity levels that satisfy predetermined expression levels;
identifying tissue regions in the first image encompassing the cells identified in the first image;
identifying mapped tissue regions in the second image by mapping the tissue regions identified in the first image to the second image;
detecting signals in the mapped tissue regions that correspond to at least one second biomarker of the one or more second biomarkers; and
assessing whether nuclei in the mapped tissue regions have genetic aberrations based on the signals, wherein a portion of the signals correspond to a first nucleic acid biomarker and a portion of the signals correspond to a second nucleic acid biomarker, and wherein assessing whether nuclei in the mapped tissue regions have genetic aberrations based on the signals comprises calculating a ratio of dots corresponding to the portion of the signals corresponding to the first nucleic acid biomarker to dots corresponding to the portion of the signals corresponding to the second nucleic acid biomarker.

14. The one or more non-transitory computer-readable media of claim 13,
wherein the first image corresponds to a first serial tissue section of the biological sample and the second image corresponds to a second serial tissue section of the biological sample, wherein the first serial tissue section is adjacent to the second serial tissue section.

15. The one or more non-transitory computer-readable media of claim 13, wherein at least one first biomarker of the one or more first biomarkers is an HER2 protein biomarker and the at least one second biomarker is a Chromosome 17 nucleic acid biomarker.

16. The one or more non-transitory computer-readable media of claim 13, wherein mapping the tissue regions identified in the first image to the second image results in the tissue regions identified in the first image being identified in the second image.

17. The one or more non-transitory computer-readable media of claim 13, further comprising:
  identifying dots in the mapped tissue regions corresponding to the signals in the mapped tissue regions; and
  accessing whether the nuclei in the mapped tissue regions have genetic aberrations based on the dots.

18. The one or more non-transitory computer-readable media of claim 13, wherein assessing whether nuclei in the mapped tissue regions have genetic aberrations based on the signals comprises determining whether a total number of dots corresponding to the signals meet a predetermined threshold value.

\* \* \* \* \*